US006234346B1

(12) United States Patent
Castleberry

(10) Patent No.: US 6,234,346 B1
(45) Date of Patent: May 22, 2001

(54) SNACK DISPENSER

(75) Inventor: Billy J. Castleberry, Lubbock, TX (US)

(73) Assignee: Newco Enterprises, Inc., St. Charles, MO (US)

( * ) Notice: Subject to any disclaimer, the term of this patent is extended or adjusted under 35 U.S.C. 154(b) by 0 days.

(21) Appl. No.: 09/111,333

(22) Filed: Jul. 7, 1998

Related U.S. Application Data

(60) Provisional application No. 60/052,289, filed on Jul. 11, 1997.

(51) Int. Cl.[7] .................................................... B65G 59/00

(52) U.S. Cl. ........................................ 221/132; 211/129.1

(58) Field of Search .................................... 221/132, 131, 221/130, 123, 92, 155; 211/126.12, 163, 188, 11, 126.7, 129.1, 130.1, 132.1

(56) References Cited

U.S. PATENT DOCUMENTS

| | | | | |
|---|---|---|---|---|
| 931,961 | * | 8/1909 | Robinson | 211/129.1 |
| 2,171,492 | | 8/1939 | Errera | 194/85 |
| 3,163,275 | | 12/1964 | Andrews et al. | 194/2 |
| 3,372,784 | | 3/1968 | Ross et al. | 194/2 |
| 3,752,287 | | 8/1973 | Cullum | 194/10 |
| 3,779,357 | | 12/1973 | Haller et al. | 194/5 |
| 3,828,903 | | 8/1974 | Levasseur | 194/1 |
| 3,848,718 | | 11/1974 | Bookout | 194/1 |
| 4,109,774 | | 8/1978 | Hayashi | 194/1 |
| 4,280,181 | | 7/1981 | Levasseur | 364/464 |
| 4,301,909 | | 11/1981 | Snavely | 194/2 |
| 4,534,474 | * | 8/1985 | Ng | 211/129.1 |
| 4,757,956 | * | 7/1988 | Mc Guire | 211/132.1 |

* cited by examiner

*Primary Examiner*—Kenneth W. Noland
(74) *Attorney, Agent, or Firm*—Paul M. Denk

(57) ABSTRACT

A snack dispenser consists of a series of tiers stacked to resemble a wedding cake. Each tier includes a trough divided into slots. A snack may be placed into each slot. The front of each slot is transparent. The troughs or trays are mounted on a rotatable carousel. The carousel is covered with a backshell and a transparent front shell. The front shell has transparent doors therein. By inserting a proper amount of money and aligning the carousel so that the desired snack is beneath a door; the door may be opened and the customer may withdraw his snack from that slot. The opening of the door blocks the rotation of the carousel, blocks the opening of the remaining doors, and also resets or cancels the credit of the coins inserted. When the single door is closed again, all doors will be blocked so that a person can not again open a door until proper coins are inserted. To service the dispenser the front shell is removed. A segment of all tiers is removed. All segments are removed and collapsed from stacked position to flat position. Replenished flat segments are removed from a box, telescoped, and placed on the dispenser. The removed flat segments are placed in the box and the front shell replaced.

10 Claims, 30 Drawing Sheets

FIG 9
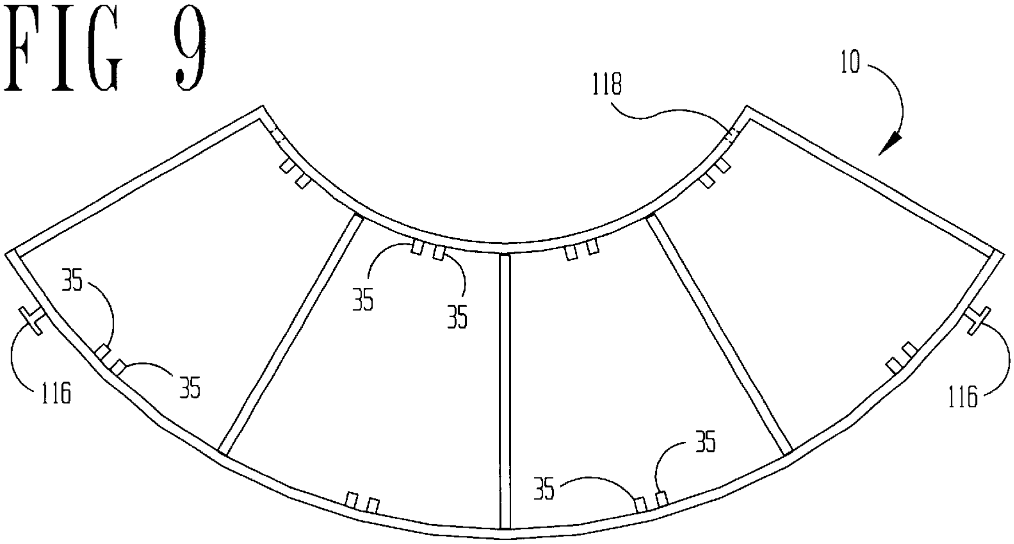
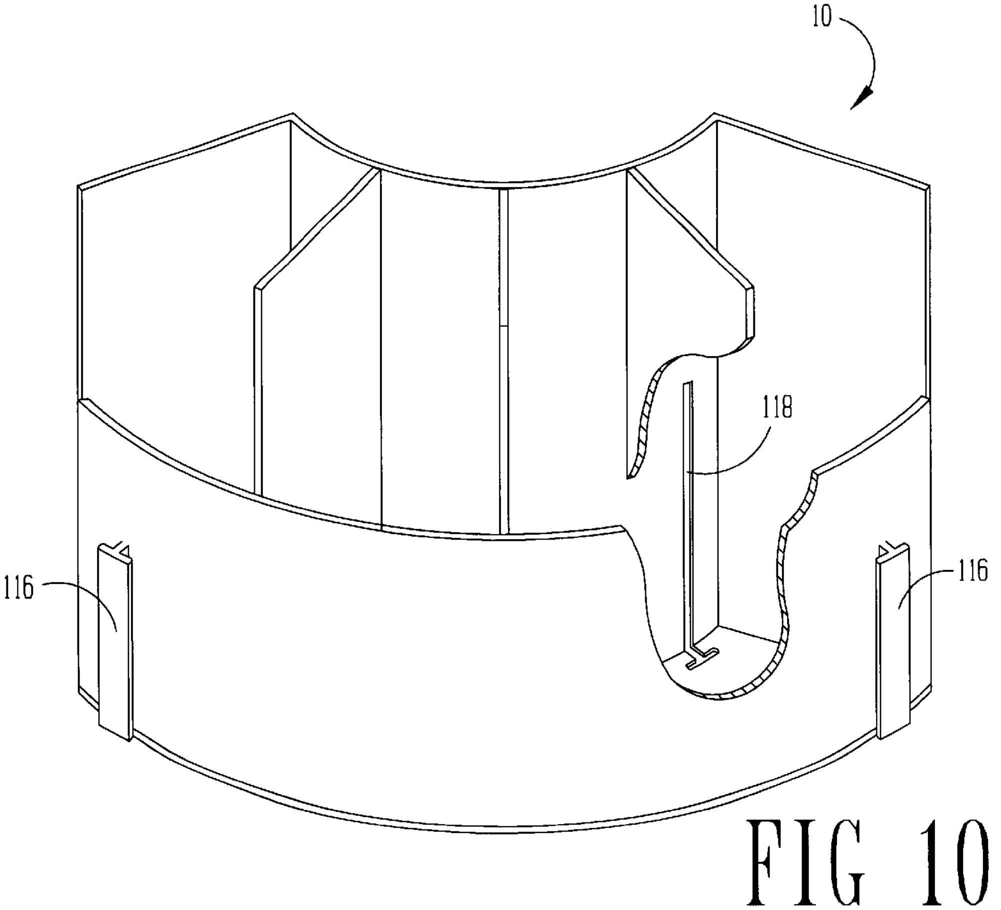
FIG 10

FIG 16
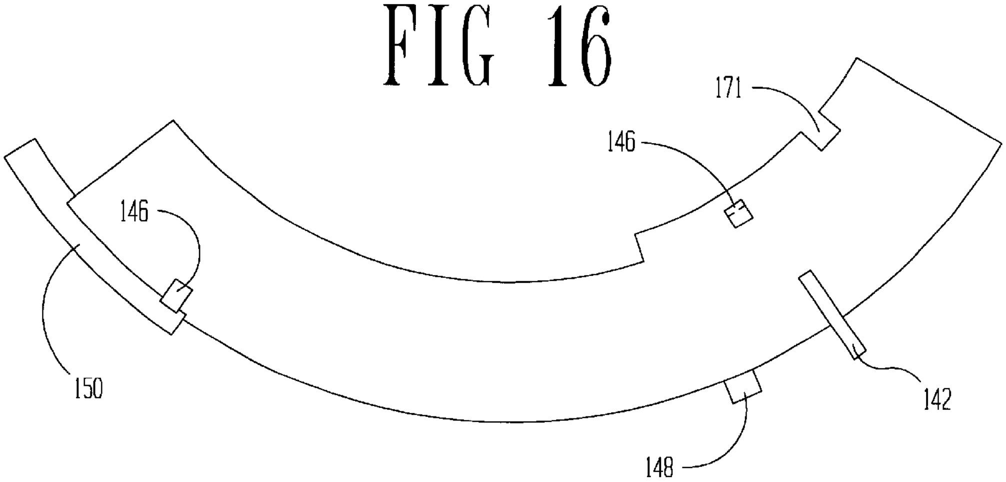
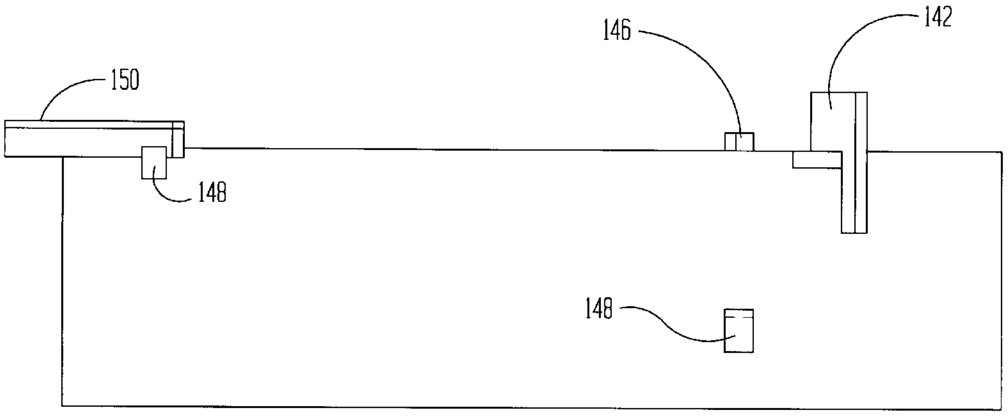
FIG 15

FIG 41
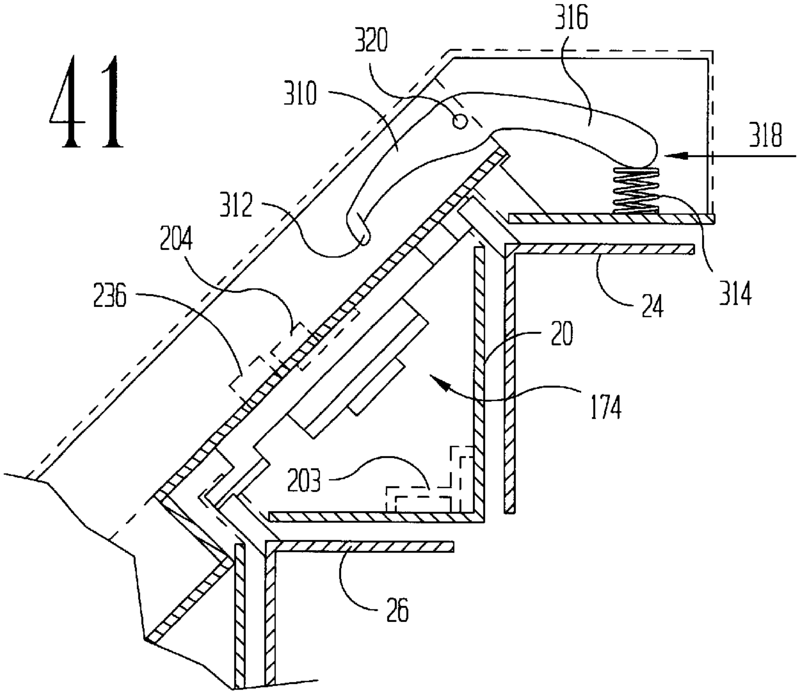
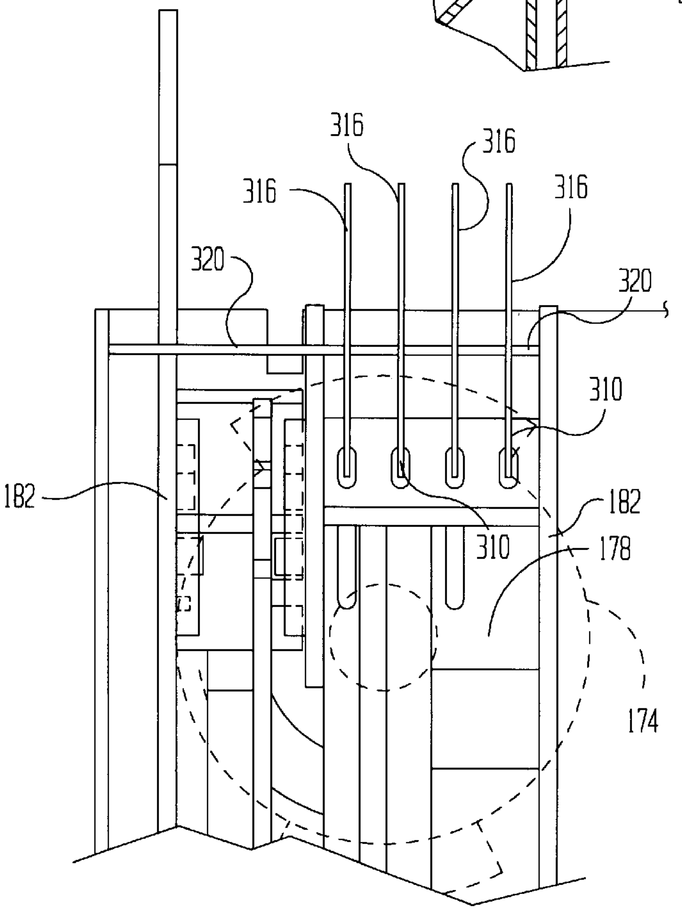
FIG 42

SNACK DISPENSER

CROSS REFERENCE TO RELATED APPLICATIONS

Applicant filed Disclosure Document #378,326 on Jul. 24, 1995 which document concerns this application; therefore, by separate paper it is respectfully requested that the document be retained and acknowledgment thereof made by the Examiner. (MOPEP 1706)

Applicant further filed a Provisional Application on this subject matter Jul. 11, 1997, application Ser. No. 60/052,289. Specific reference is made to that document.

BACKGROUND OF THE INVENTION (1) Field of the Invention

This invention relates to snack dispensers generally. Vending dispensers or vending machine owners and lessors have ordinary skill in this art.

(2) Description of the Related Art

The art related to this invention falls into two major categories: 1) honor system dispensers; and 2) full security vending systems.

Honor system snack dispensers are those dispensers where the product is displayed in an uncovered and unattended manner. When a customer desires to purchase one of the snacks contained therein, he places money in a box and removes the desired item. The term "honor system" stems from the fact that not only is there not a check to be sure the proper amount of money was entered in the box, but also there is no way to tell that any money was entered in the box at all. The "honor system" dispensers are generally used in offices and other areas not generally open to the public.

Vending companies that maintain these honor system boxes make their use economical by having very short turnaround times for replenishment. The replenishment usually takes place by having a vending company employee carry in an entire new product box, with empty change box, and replace the existing box. Restocking of the depleted box and removal of the change contained therein usually takes place at a central processing facility.

These honor system boxes have the advantages that they are: 1) inexpensive to build; and 2) easy to replenish. They have the disadvantages that not everyone utilizing such facilities are honest.

The second type related art are full security vending machines placed for use by the general public. These machines are fully secured in that there is no possibility, save extensive physical damage, that the product or the change revenues can be pillaged.

These large machines have the advantage that they are secure. They have the disadvantage that they are expensive, very time consuming to replenish, and not economically feasible for small vending accounts.

SUMMARY OF THE INVENTION (1) Progressive Contribution to the Art

This snack dispensing device was created to retain the advantages of the honor snack dispensing systems, but also to add the security features present in the larger, general public machines. In other words, this snack dispensing system occupies the middle ground between the honor system snack dispensers and the full security general public dispensers. This system is designed for the smaller, not generally open to the public, snack dispensing situations; however, the system is designed to gain security of the product and proceeds in a relatively inexpensive device.

(2) Objects of this Invention

An object of this invention is to create a snack dispensing device that has the advantages of being relatively inexpensive, easy to reload, and having 96 product selections of various sizes available and visible.

Further, an object of this device is to accomplish the above mentioned objectives while gaining security over the honor system dispensing methods similar to the full security snack dispensing systems with less cost.

Another object is for the vending unit to be reliable, having as few moving parts as possible, yet not requiring an external power source.

Another object is to have the vending unit capable of quick field service, that is, replenishing the vending unit and removing the change accumulated therein, preferably in no more than two minutes.

Another object is to have as few steps as possible for the actual purchase of articles from the unit.

Another object is to identify and accumulate information about total sales and which sales were from individual level. From this information both profitability and inventory can be tracked.

Another object is to have the vending unit fit on limited size counter tops and under low height cabinets above the counter tops.

Another object is to have the hardware and system whereby during transportation of the hardware from the vending locations to a central replenishing location and back the hardware is small in volume and protected from damage.

Another object is to have high product visibility.

Yet another object is to have multiple levels of vending with each level capable of having a separate price independent of the other levels and in no particular price order.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 9 Top plan view of a tray.

FIG. 10 Perspective cutaway of tray.

FIG. 15 Front elevation view of a door.

FIG. 16 Top plan view of a door.

FIG. 25*a* Top plan view of the door lock mechanism with all the parts in place.

CATALOGUE OF ELEMENTS

Figure 1:
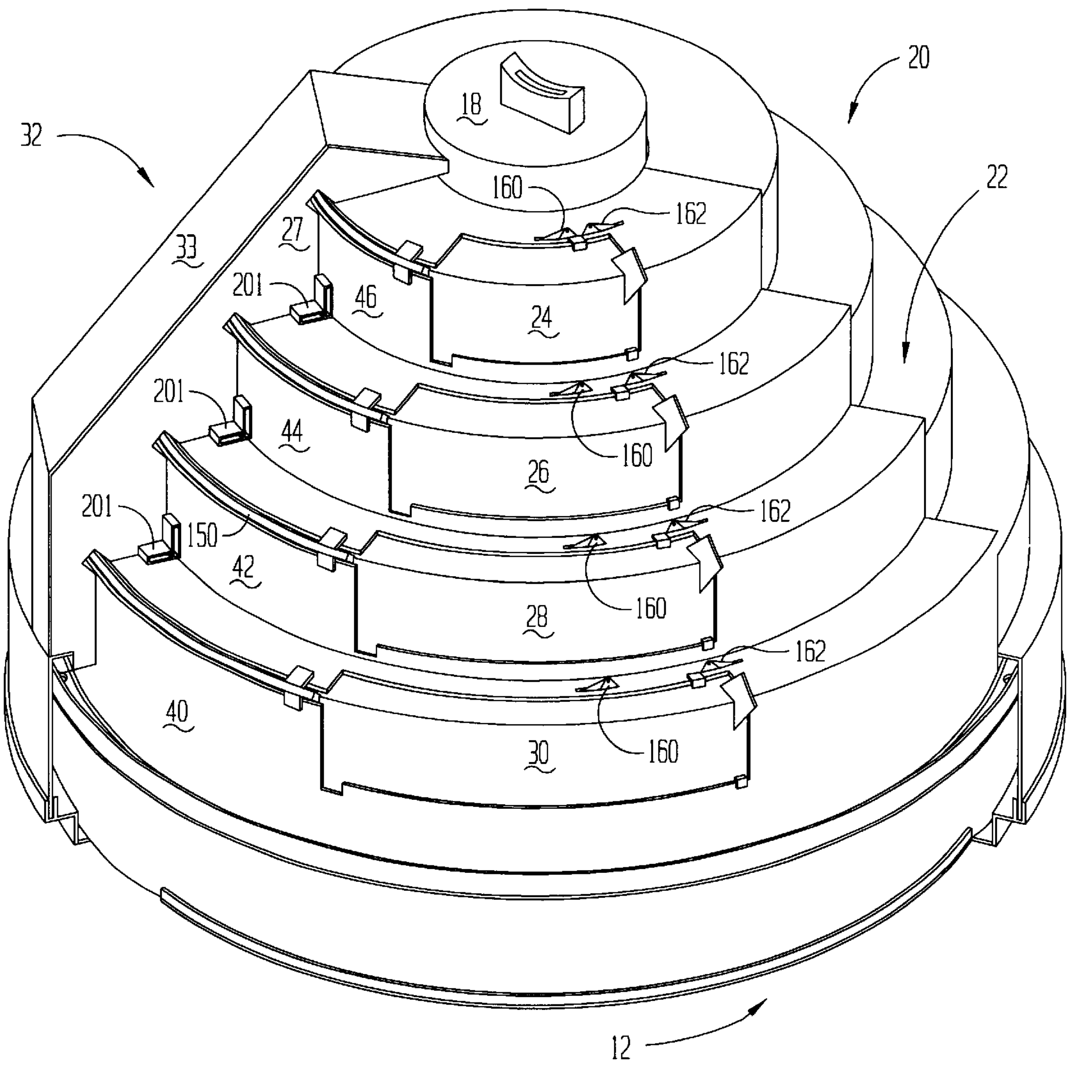
FIG. 1 Perspective front view.

As an aid to correlating the terms of the claims to the exemplary drawing(s), the following catalog and index of elements and steps is provided:

10 Tray
12 Base
13 Base plate
16 Carousel
18 Coin box
20 Back shell
22 Front shell
24 Level 4 door
26 Level 3 door
27 Front cover
28 Level 2 door
29 Board

30 Level 1 door
32 Door lock mechanism
33 Cover
33*b* Cover support, back
33*f* Cover support, front
34 Removable divider
35 Divider guides
36 Permanent Divider
40 First Level or tier
42 Second Level or tier
44 Third Level or tier
46 Fourth Level or tier
48 Shaft hole
50 Shaft
54 Mounting piece
56 Roller shaft
58 Bolt
60 Roller base
62 Roller
64 Lower ledge of roller
65 Flange
66 Flange
68 Detent support
70 Detent wheel
72 Detent guide
74 Detent spring
76 Detent applicator guide
78 Detent spring applicator
80 Groove for back shell
82 Upper center piece
84 Lower center piece
86 Detent wheel pin
88 Tray support
92 Inside circular band
96 Race
98 Detent track
102 Locking ring
104 Back shell connector lugs
106 Coin box cavity
108 Tray assembly
109 Box
110 Segment assembly
116 T-lug
118 T-groove or T-slot
130 Door hole for level 1
132 Door hole for level 2
134 Door hole for level 3
136 Door hole for level 4
138 Door cutaway
140 Pin slot
142 Handle
144 Upper edge
146 Guide or door retainer, upper
148 Guide or door retainer, lower
150 Door vane
154 Lower edge
156 Double slot
158 Single slot
160 Pin #1
162 Pin #2
164 Lever
168 Pin base
170 Block, Pin #1 System
171 Slot for pin #2 System
172 Lower Cam Arm
174 Upper Cam
176 Lower Cam Price Block Arm

177 Push location, bar
178 Cam Interlock Arm
179 Push location, shaft
180 Carousel Stop Arm
182 Guide Rails
194 Lower Cam Door 1 contact point
196 Lower Cam Door 2 contact point
198 Upper Cam Door 3 contact point
200 Upper Cam Door 4 contact point
201 Front shell clip
202 Shaft on lower cam
203 Back shell clip
204 Shaft, upper cam
205 Cover clip
206 Slot, Cam interlock arm
208 Shaft slot, lower cam price block arm
210 Door 1 Block
212 Door 2 Block
214 Door 3 Block
216 Door 4 Block
218 Interlock Arm Groove
220 Ridge on lower cam
222 Ridge Slot
224 Price Lock portion, Upper Cam
226 Downward Block or notch
228 Upward Block or notch
229 Pin opening plate
230 Price Lock portion
232 Downward Block or notch
234 Upward Block or notch
236 Shaft, Upper Cam
238 Push Bar, Cam Interlock Arm
240 Shaft, Lower Cam
242 Push Bar, Lower Cam
Price Block Arm
244 Rocker
246 Lock member
248 Groove, carousel lock arm

INDEX OF ELEMENTS

178 Arm, Cam Interlock
180 Arm, Carousel Stop
176 Arm, Lower Cam Price Block
104 Back shell connector lugs
12 Base
13 Base Plate
170 Block, Pin #1 System
29 Board
58 Bolt
109 Box
172 Cam, lower
174 Cam, upper
16 Carousel
203 Clip, back shell
201 Clip, front shell
106 Coin box cavity
18 Coin box
33 Cover
**33*b*** Cover support, back
**33*f*** Cover support, front
66 Detent
76 Detent applicator guide
72 Detent guide
74 Detent spring
78 Detent spring applicator
68 Detent support
98 Detent track

70 Detent wheel
86 Detent wheel pin
35 Divider guides
210 Door 1 Block
212 Door 2 Block
214 Door 3 Block
206 Door 4 Block
138 Door cutaway
130 Door hole for level 1
132 Door hole for level 2
134 Door hole for level 3
136 Door hole for level 4
32 Door lock mechanism
30 Door, Level 1
28 Door, Level 2
26 Door, Level 3
24 Door, Level 4
150 Door vane
226 Downward Block or notch
232 Downward Block or notch
40 First Level or tier
65 Flange
46 Fourth Level or tier
27 Front cover
80 Groove for back shell
248 Groove on the carousel lock arm
146 Guide or door retainer, upper
148 Guide or door retainer, lower
182 Guide Rails
142 Handle
92 Inside circular band
218 Interlock Arm Groove
164 Lever
246 Lock member
102 Locking ring
194 Lower Cam Door 1 contact point
196 Lower Cam Door 2 contact point
84 Lower center piece
154 Lower edge
64 Lower ledge of roller
54 Mounting piece
36 Permanent Divider
160 Pin #1
162 Pin #2
168 Pin base
229 Pin opening plate
140 Pin slot
224 Price Lock portion, upper Cam
230 Price Lock portion, upper Cam
238 Push Bar, Cam Interlock Arm
242 Push Bar, Lower Cam Price Block Arm
177 Push location bar
179 Push location shaft
96 Race
34 Removable divider
220 Ridge on lower cam
222 Ridge Slot
244 Rocker
62 Roller
60 Roller base
56 Roller shaft
42 Second Level or tier
110 segment assembly
50 Shaft
48 Shaft hole
202 Shaft on lower cam
208 Shaft slot, lower cam price block arm

240 Shaft, lower Cam
204 Shaft, upper cam
236 Shaft, upper Cam
20 Shell, back
22 Shell, front
206 Slot, cam interlock arm
156 Slot, double
171 Slot for Pin #2 System
158 Slot, single
118 T-groove or T-slot
116 T-lug
44 Third Level or tier
10 Tray
108 Tray assembly
88 Tray support
198 Upper cam door 3 contact point
200 Upper cam door 4 contact point
82 Upper center piece
144 Upper edge
228 Upward block or notch
234 Upward block or notch

DESCRIPTION OF THE PREFERRED EMBODIMENTS

There are seven major components to the snack dispenser: base 12, the carousel 16, back shell 20, the trays 10, front shell 22, pin system 160 & 162, and door lock mechanism 32.

Referring to FIG. 1, the snack dispenser has four circular levels. Each level is similar in many respects. The first level 40 has the largest radius and fourth level 46 has the smallest radius; therefore, the snack dispenser design resembles a “wedding cake”. The material used in the prototype was a transparent plastic; however, this material may change depending upon the application desired.

Shown in FIGS. 2, 4, 5, and 6, base 12 is the lowest section of the snack dispenser. Shaft 50 is at the center of the base 12. Shaft 50 is supported by mounting piece 54 on base plate 13. A bolt 58 through mounting piece 54 holds the shaft in place. The shaft 50 defines the vertical axis of the snack dispenser and enables rotation of the carousel. The carousel 16 and trays 10 of the snack dispenser rotate about this vertical center axis.

Rotation of the carousel is facilitated by six rollers 62. Lower ledge 64 of the roller 62 supports the race 96 of the carousel 16.(FIG. 4) Flange 65 on the roller aids in centering the race 96. Detent system 66 align stop positions.(FIGS. 2 & 5) Each of the detents include the circular detent wheel 70 and spring 74. Detent wheels 70 ride in the detent track 98 of the carousel 16. The detent wheel is held in place by detent guides 72, detent applicator guide 76 mounted on the plate 13 and detent wheel pin 86 on applicator 78. The spring is held in place by detent support 68 on the plate 13. The force of the spring is applied to the detent wheel by the detent spring applicator 78. The purpose of the detent is to facilitate incremental stopping and controlling the carousel. FIGS. 4 and 5 demonstrate the process by which the detent wheels 70 ride on the detent track 98 of the carousel 16. Incremental movement of the carousel is possible due to the individual sections in the detent track 98 which allow the detents to only move one single slot 158 length at a time. The customer may rotate the carousel by the use of a locking ring 102.(FIGS. 3 & 4) It will be understood that the detent tract 98 shown in FIG. 5 is an integral portion of the carousel 16. Everything above the detent tract 98 is cut away to show the interrelationship between the detents 66 and the detent track 98.

Figure 2:
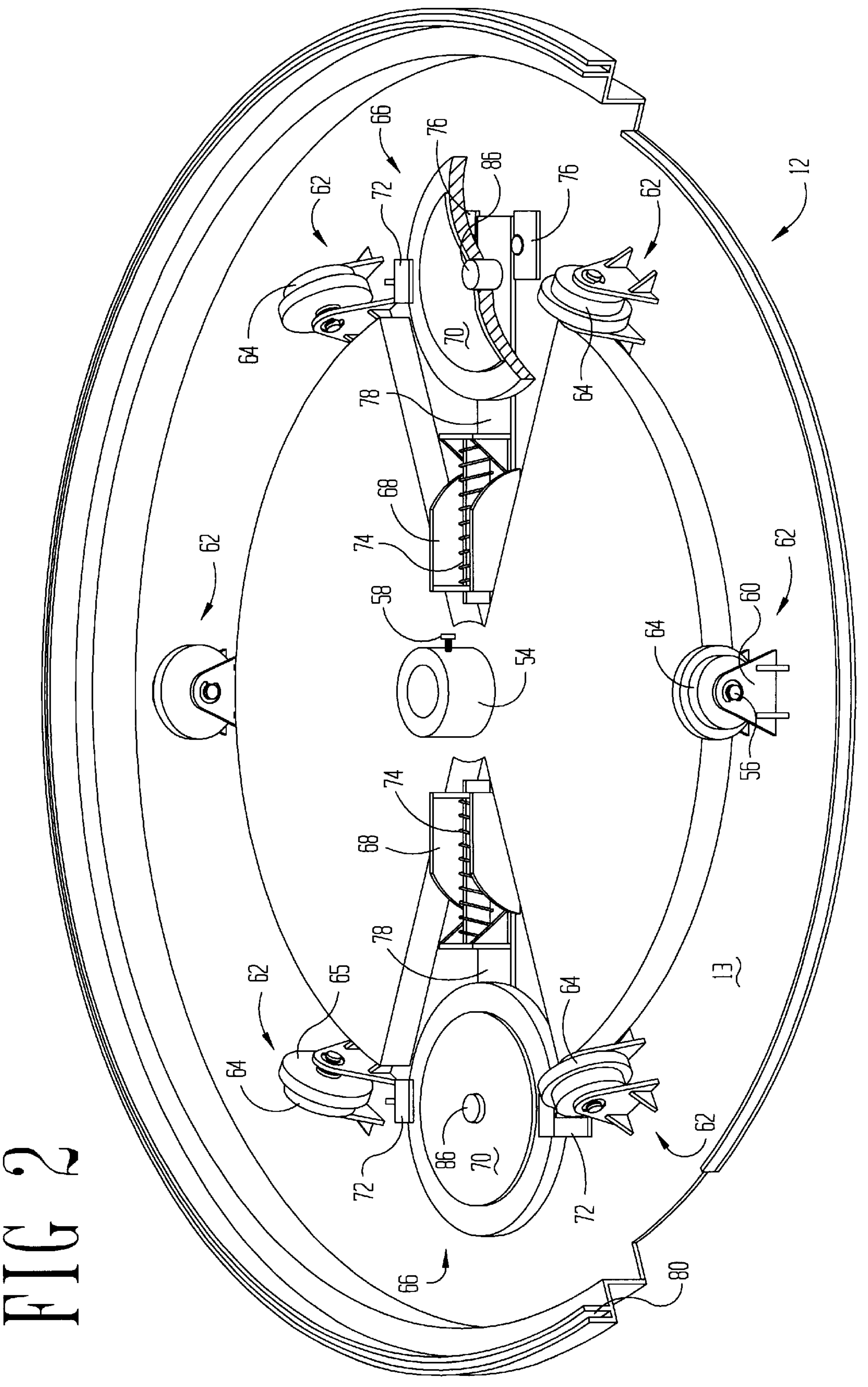
FIG. 2 Perspective view of the base.

FIG. 4 shows a cross-section of the entire invention. It will be noted that the cut for this view is not a straight line through the center. Referring to FIG. 2, the cut (upon which FIG. 4 is taken) is somewhat of a zigzag starting with a cut through the center of the left most detent 66, then proceeding toward the front of the invention. The cut then turns and cuts through the center of the left front roller 62 to the center, and then back out to the right front roller 62, then through the right most detent 66. The purpose of the zigzag cut of this figure is to demonstrate not only the interrelationship between the many parts indicated therein but specifically the relationship of the detent 66 to the detent track 98 and the relationship of the roller 62 with the race 96.

Figure 3:
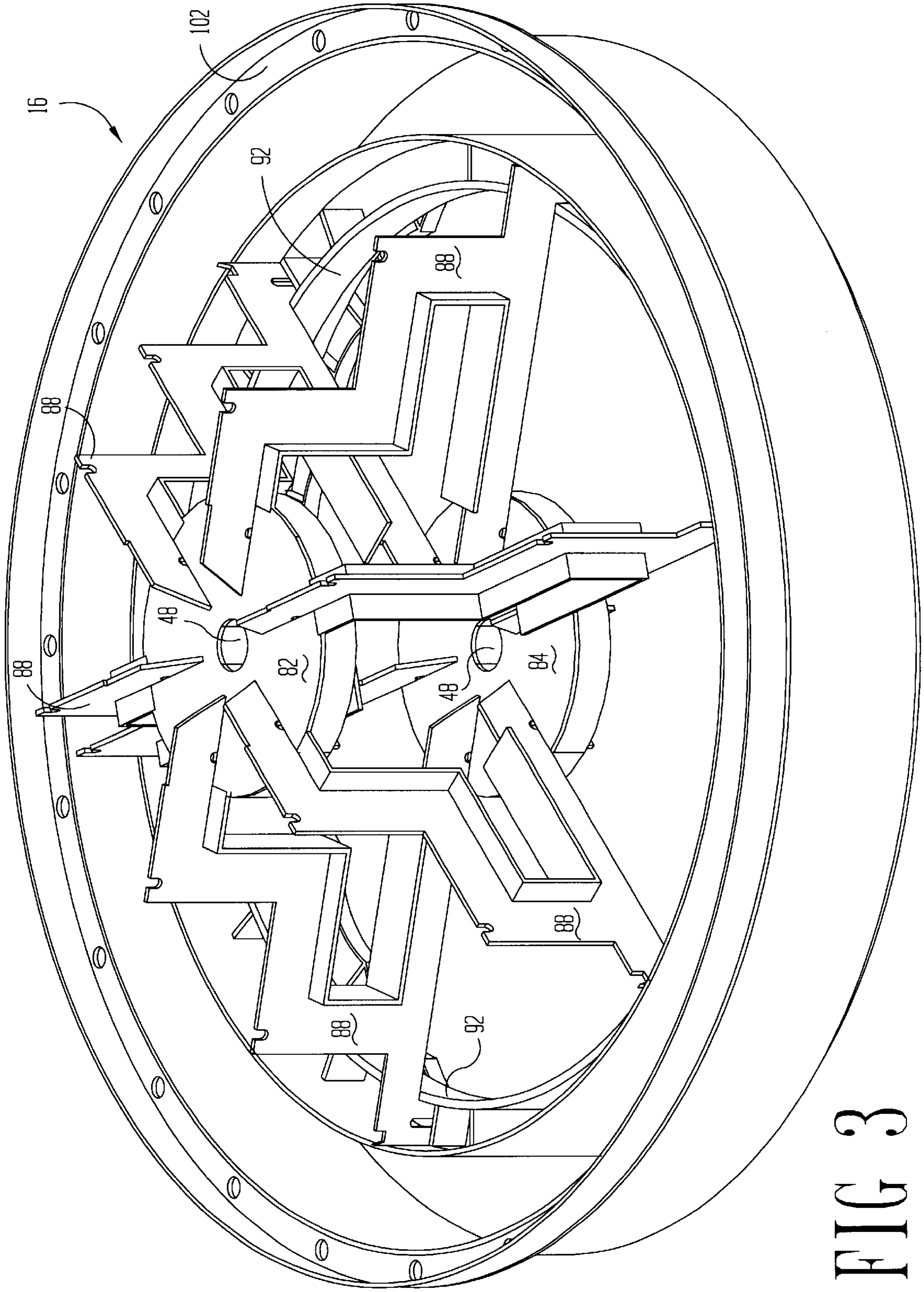
FIG. 3 Perspective view of the carousel.
Figure 4:
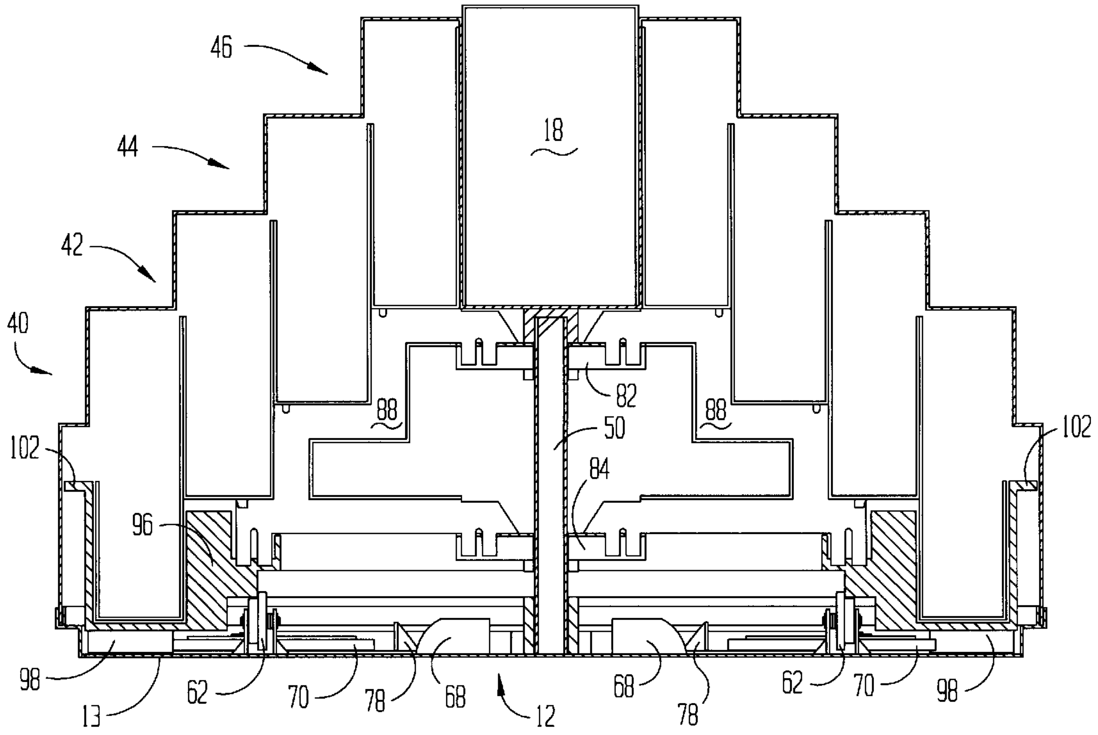
FIG. 4 Cross-section of snack vendor.
Figure 5:
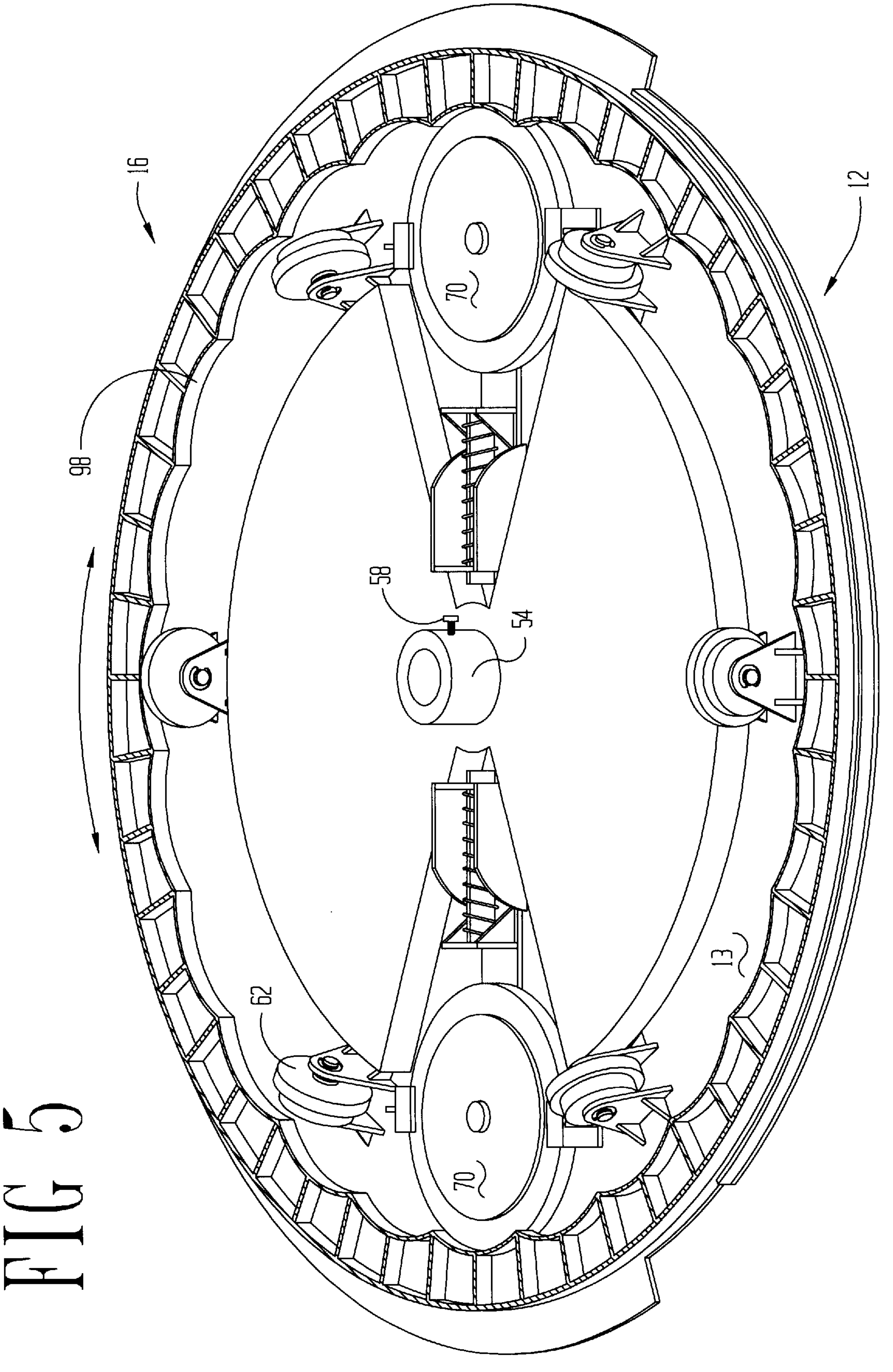
FIG. 5 Perspective of base and cutaway detent track.
Figure 6:
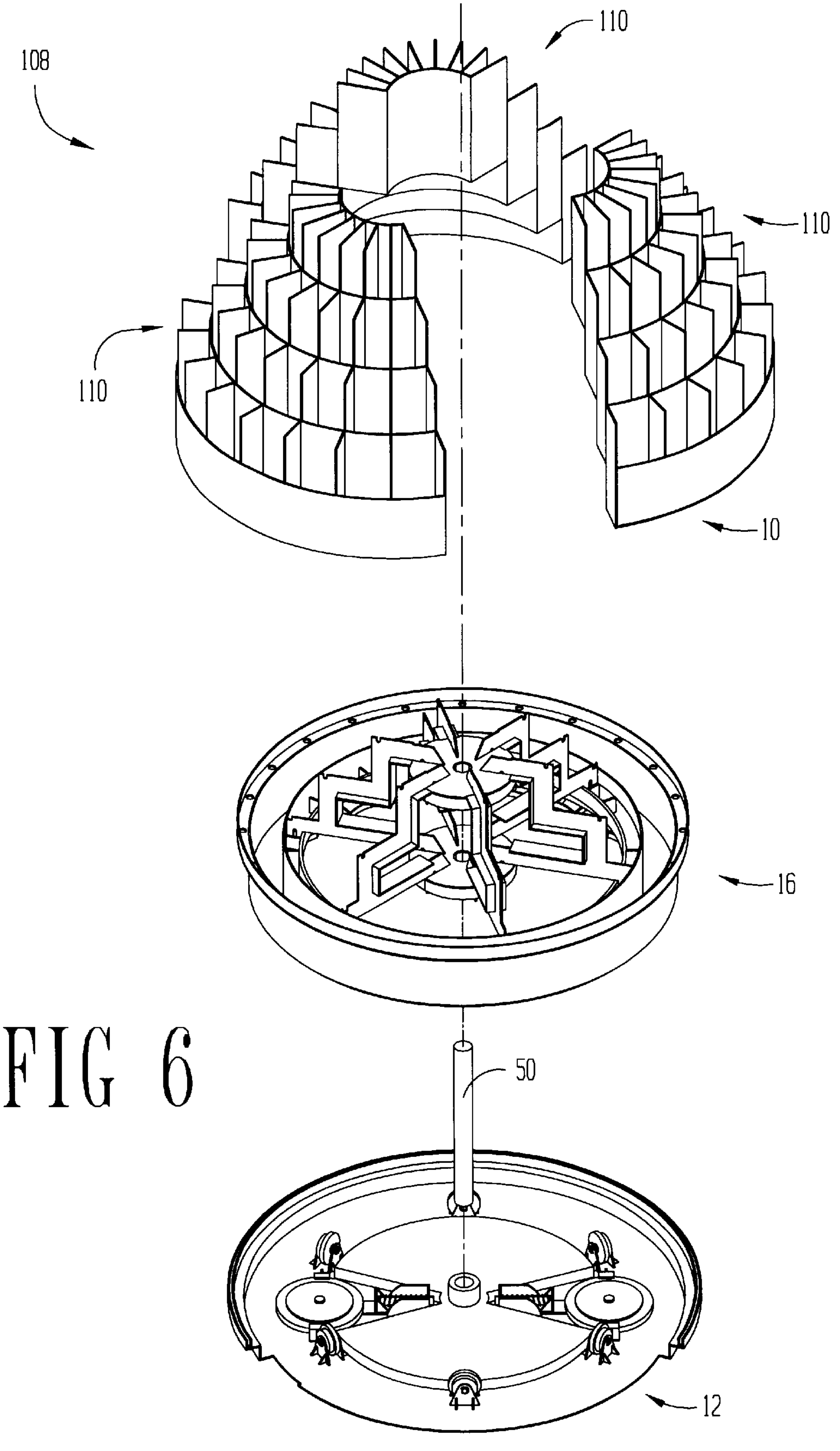
FIG. 6 Exploded schematic of base,carousel and tray assemblies.

Referring to FIGS. 3 and 4, the carousel includes two identical circular center pieces, lower piece 84 and upper piece 82. The carousel 16 is placed on top of the base 12. Shaft 50 extends through the shaft hole 48 of each of the center pieces 82 & 84. The center pieces are supported by six tray supports 88. The tray supports 88 are attached to an inside circular band 92 on the race 96. As discussed above, the race 96 is supported by the rollers 62 in order to allow the carousel to move smoothly.

Figure 7:
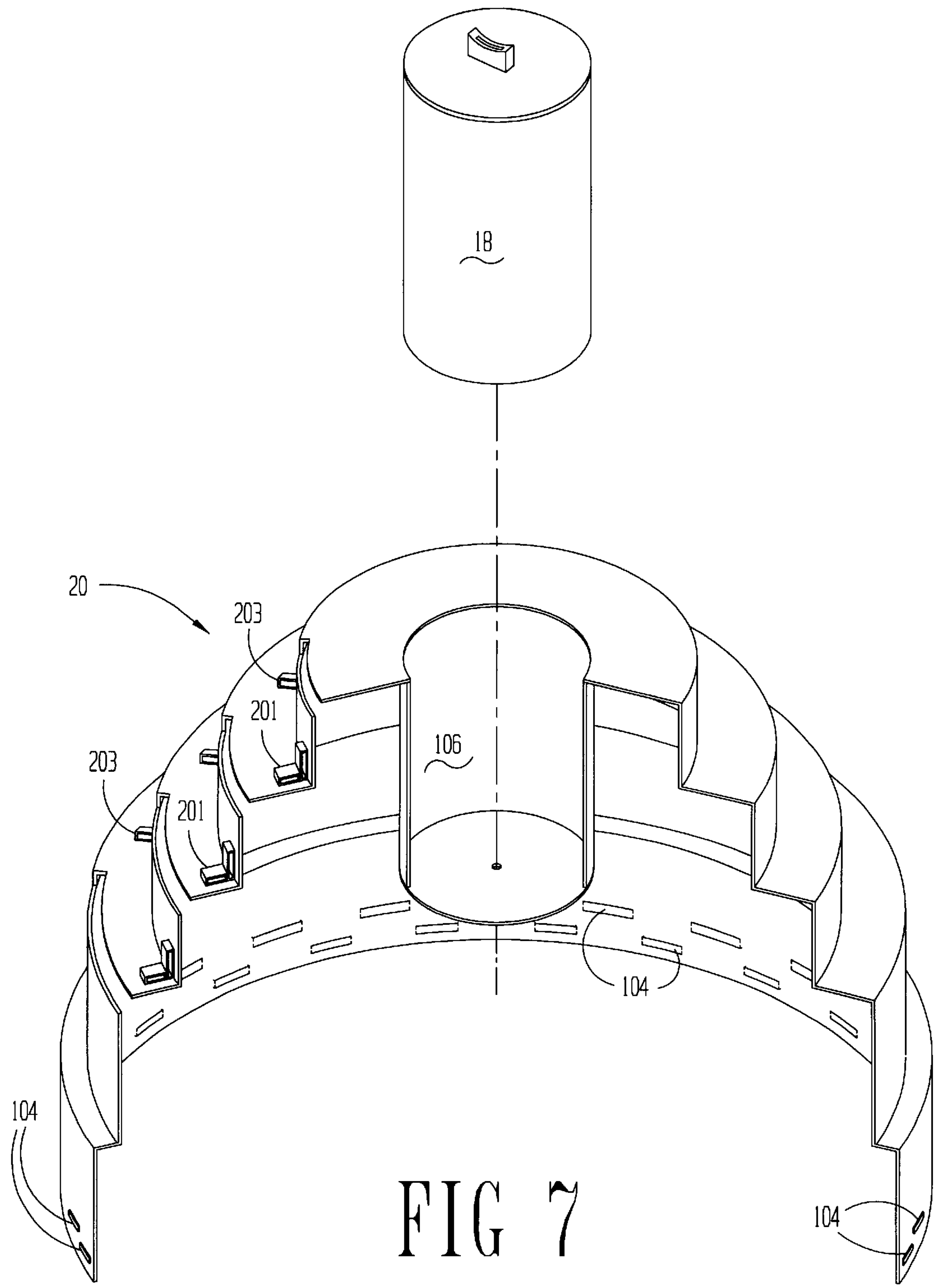
FIG. 7 Perspective view of back cover.

After the carousel is placed onto the base, the back shell 20 is placed in groove 80 located along roughly two thirds of the periphery of the base.(FIGS. 2, 4 and 7) The back shell 20 is attached by the connector lugs 104 shown in FIG. 7 in slots (not shown for clarity of drawings) in groove 80.

Besides providing a portion of an exterior, the back shell supports the coin box 18 inside the coin box cavity 106. The coin box 18 allows the customer to insert coins into the bank container, which are processed, and then credit information is communicated to the door lock mechanism 32 to ensure that the proper payment has been made for the desired selection. The specifics of the coin box are beyond the scope of this application and are not shown for simplicity.

Figure 8:
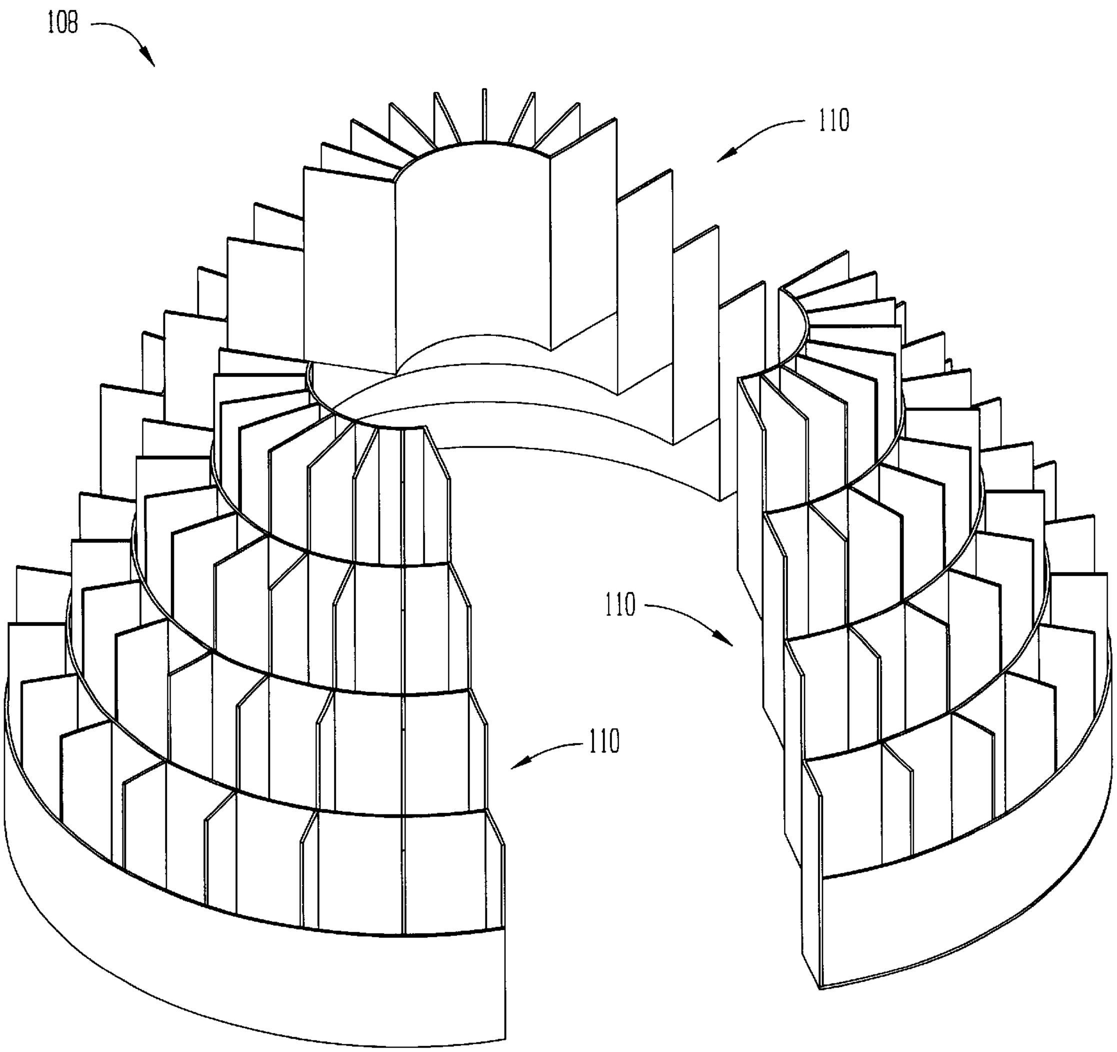
FIG. 8 Perspective view of tray assemblies

Individual snack items are placed in a tiered tray assembly 108. (FIG. 8) A tier or level is defined as a row along which the trays are located. Each tray 10 on a particular tier is of identical size proportions. The snack dispenser has four tiers. The four tiers are distinguishable by their diameter and the amount of money required to purchase a snack from the specific tier. The tiered tray assembly 108 in this embodiment comprises three segment assemblies 110. Each segment assembly spans 120 degrees of the complete circle of the tiered tray assembly 108 of the embodiment shown. It will be understood that any number of segment assemblies could be used, so long as they comprise the complete circle of the tiered tray assembly. With all the trays 10 in place on a particular level, the trays form a circular trough. The term trough indicating that a cross section of the trays would reveal squared bottoms. Circular indicating the square bottom troughs form a complete circle.

In order to accommodate some larger products, the trough width of the top two trays 44 and 46 is greater than the trough width of the bottom two trays 40 and 42.

Referring to FIGS. 9 and 10, each tray (42, 44 and 46) on levels 2, 3, and 4 has T-lugs 116. Each tray (40, 42, and 44) on level 1, 2, and 3 has T-grooves or T-slots 118. The process of collapsing and expanding the trays is an interrelationship between the T-lugs and T-grooves. T-lug 116 of one tray is placed first in T-groove 118 of a next larger diameter tray. The T-lug 116 is then extended to the top of the T-groove of the larger tray. This process is repeated for each individual tray until all four levels have been connected to form a segment assembly 110 which resembles FIG. 11 when collapsed, and FIG. 12 when telescoped. The segment assemblies 110 telescoped and placed on the carousel form the "wedding cake" formation shown in FIGS. 1 and 4.

Once all three segment assemblies 110 have been added, the front shell 22 is placed on the snack dispenser. The front shell 22 and the back shell 20 mesh and lock to secure the snack vendor. Each horizontal surface of the back shell 20 has grooves or slots on the edges closest to the front cover and away from the door lock mechanism 32. The front shell 22 has complimentary protrusions that fit into the grooves or slots of the back shell 20. Thus, locking the front and back shells to secure the snack vendor is accomplished by placing the front shell 22 slightly overlapping the back shell 20 on the side opposite the door lock mechanism 32. As seen from above then, the front shell 22 is rotated clockwise such that the protrusions on the front shell 22 complimentary to the grooves or slots on the back shell 20 lock into place. Further, this clockwise rotation moves a portion of the front shell 22 on the door lock mechanism 32 side to be under a portion of the door lock mechanism. This portion of the door lock mechanism is locked in place at this location by any of a number of various locking techniques.

Figure 13:
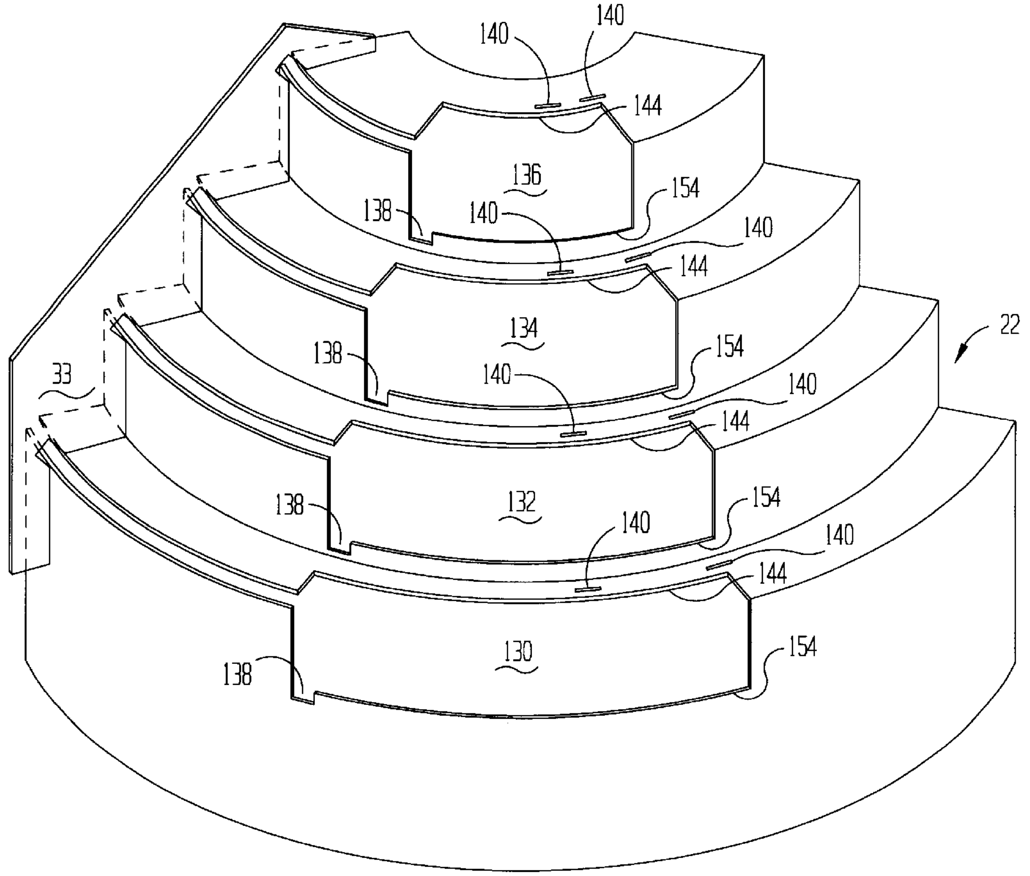
FIG. 13 Perspective of front shell.

The front shell has four door holes 130, 132, 134, and 136. (FIG. 13) Each door hole has one door cutaway 138, to allow the door to snap into the door slots and be easily removed, two upper door guides 146 and two lower door guides 148.

Figure 14:
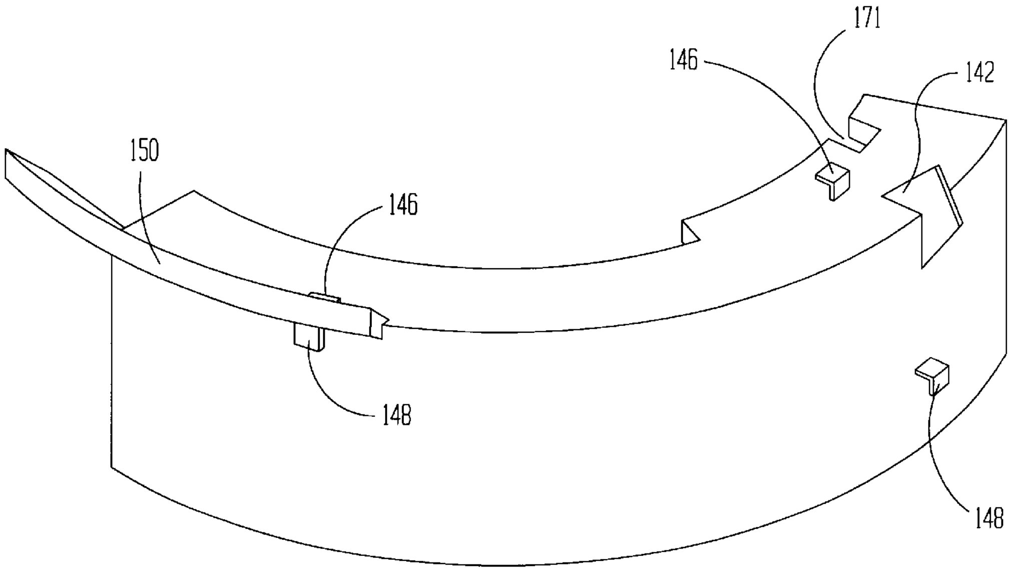
FIG. 14 Perspective of a door.

A door is illustrated in FIGS. 14, 15, and 16. It will be understood that the drawing figures are representative of all four doors 24, 26, 28 and 30 (FIG. 1). Each door will have a different radius of curvature and length, and there are two different widths, but they will all be proportionally the same. Each door has a handle 142 which is used for sliding the door in the lateral arc. The guides 146 and 148 are used to ensure that the door will not get out of alignment or be difficult to open. Guides 146 slide along edge 144. (FIG. 13) Guides 148 slide along edge 154. Door vane 150 is used to guarantee that the door can only open to the maximum length of a slot. For instance, if the snack selected is in a double size slot 156, the door vane 150 will hit against the back shell 20.

Figure 11:
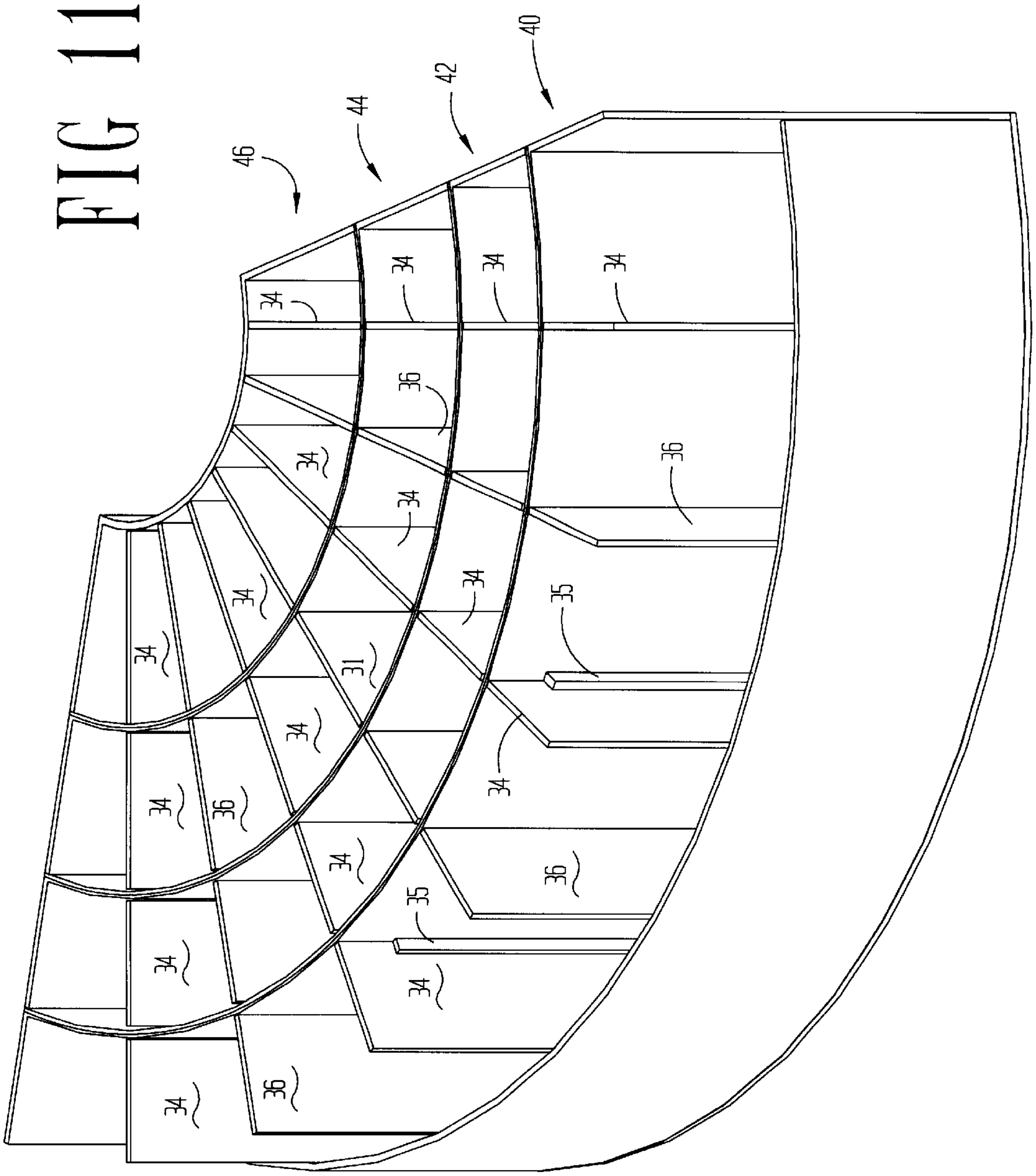
FIG. 11 Perspective of a collapsed segment assembly.
Figure 12:
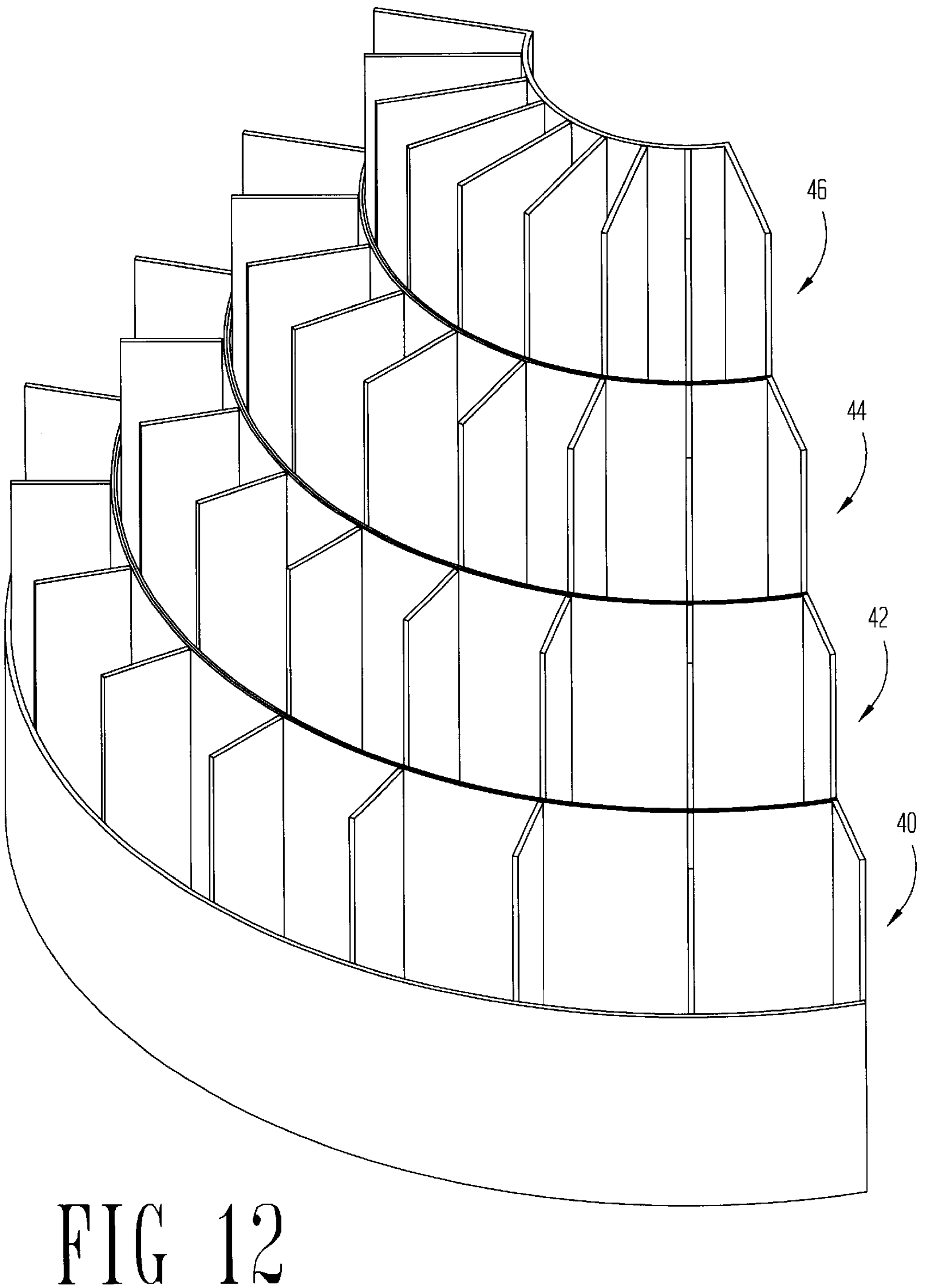
FIG. 12 Perspective of a telescoped segment assembly.
Figure 17:
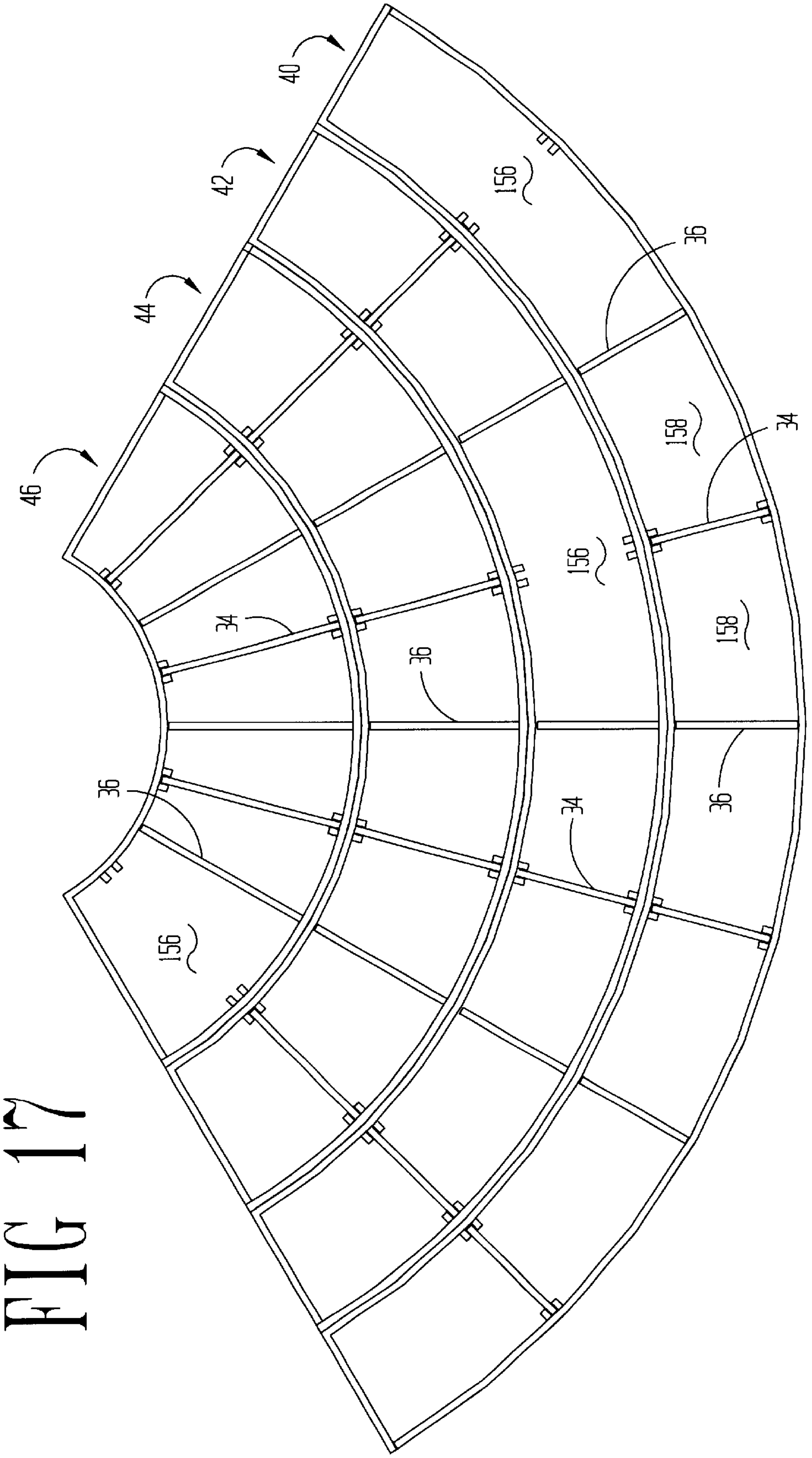
FIG. 17 Top plan of a segment assembly.
Figure 19:
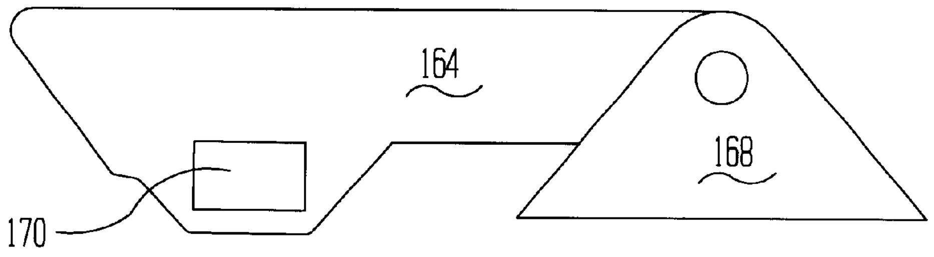
FIG. 19 Side view of a pin system.
Figure 18:
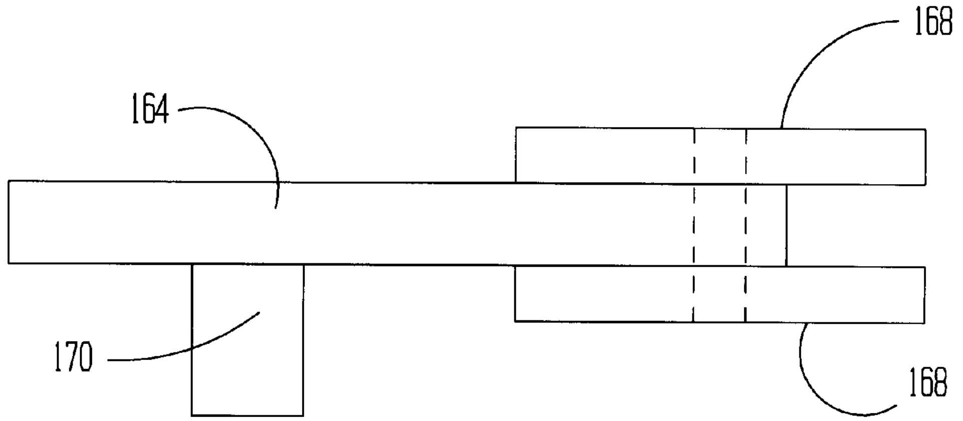
FIG. 18 Top plan of a pin system.

Each individual tray is further divided into individual slots 156 and 158 as shown in FIG. 17. The slots are defined by both permanent 36 and removable dividers 34. (FIGS. 11 & 17) The removable dividers are inserted or removed to allow for either single slot 158 or double slot 156 sized compartments. As seen in FIGS. 11 and 17, the removable dividers 34 are held in place by divider guides 35. The perspective view of FIG. 11 shows some of the divider guides 35, but not all of them are shown for simplicity of the drawing. It will also be noted that although in this embodiment of the invention each slot is capable of division into two slots by placement of the removable divider 34, it is not necessary that each and every full size slot be divisible.

Figure 20:
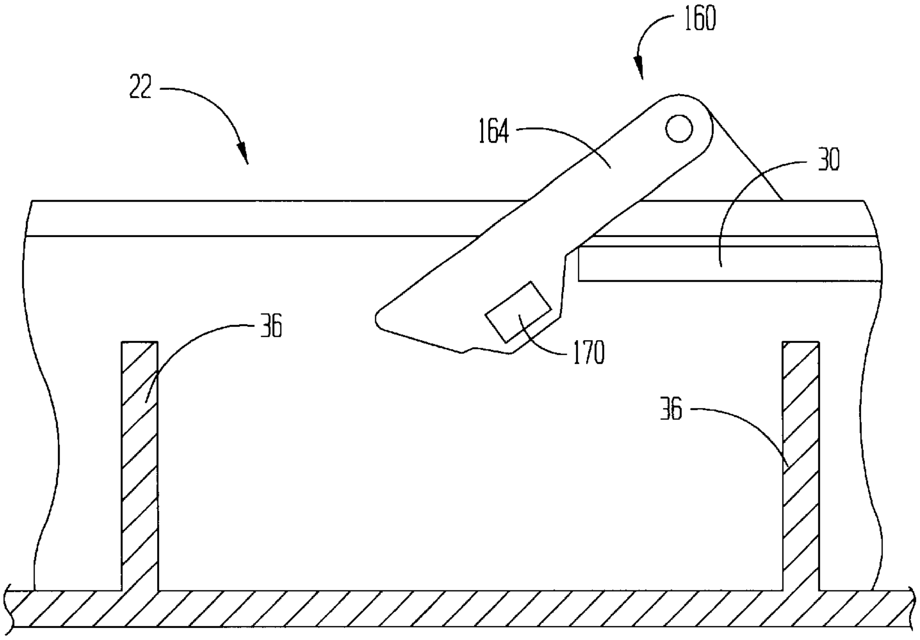
FIG. 20 Schematic of the pin system without a removable divider.
Figure 21:
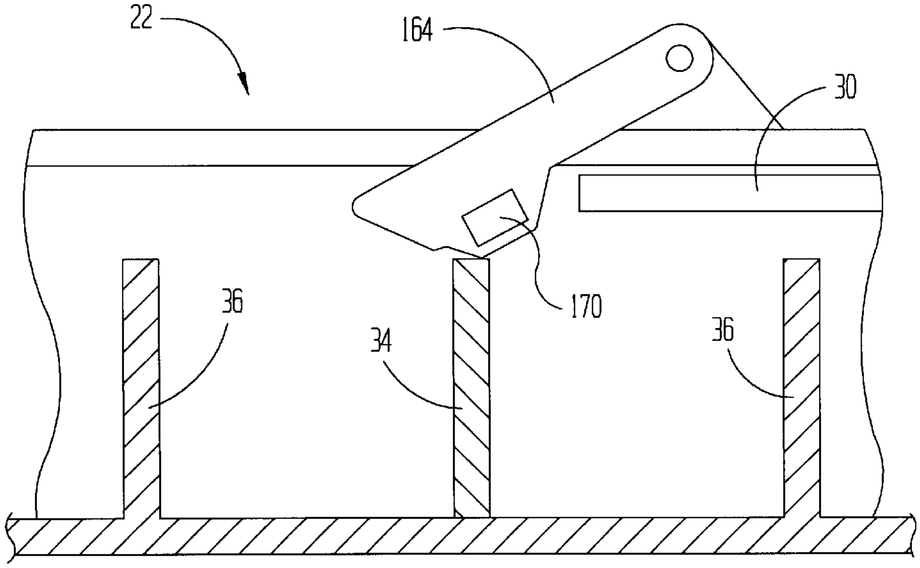
FIG. 21 Schematic of the pin system with a removable divider present.
Figure 22:
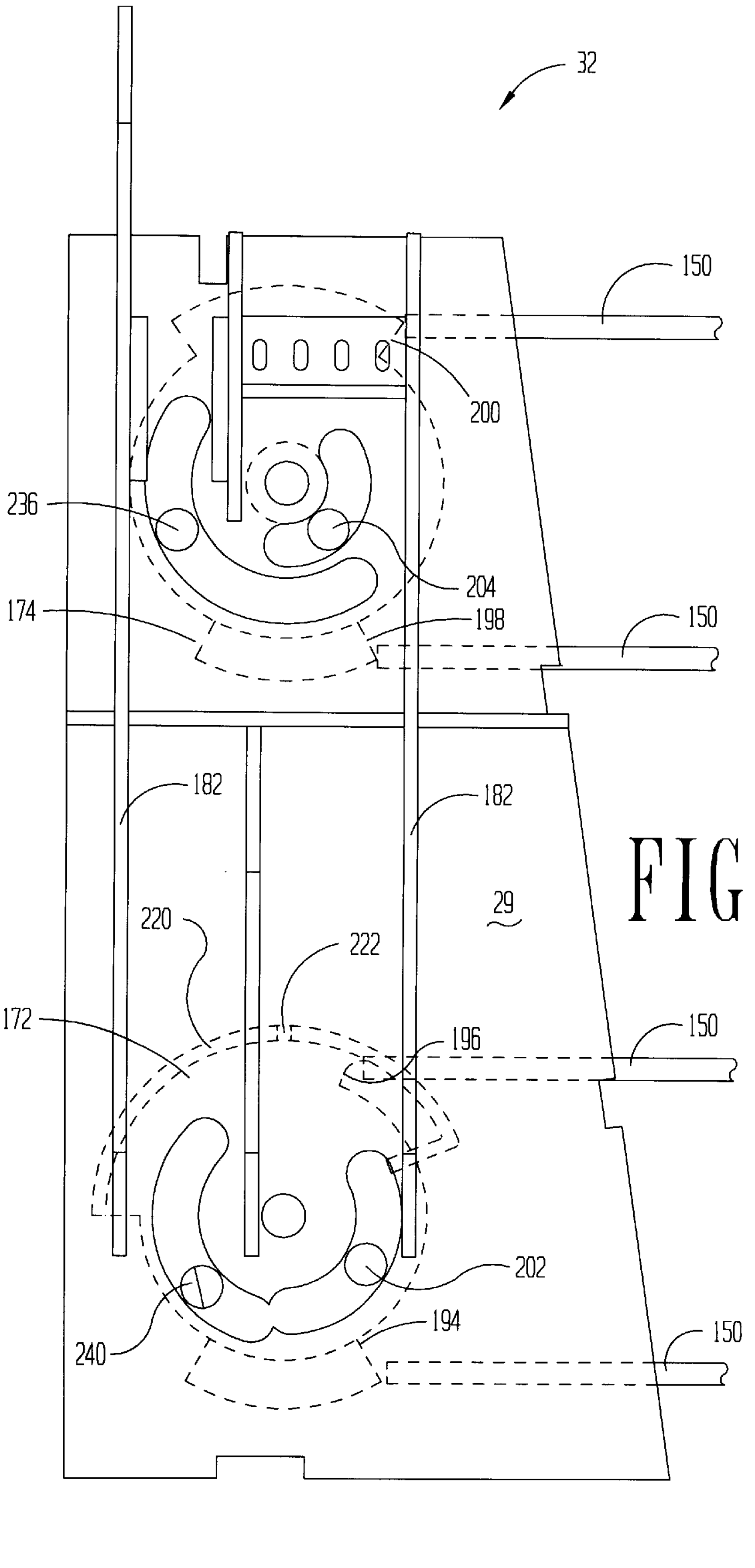
FIG. 22 Top plan view of the door lock mechanism with no arms in place.
Figure 23:
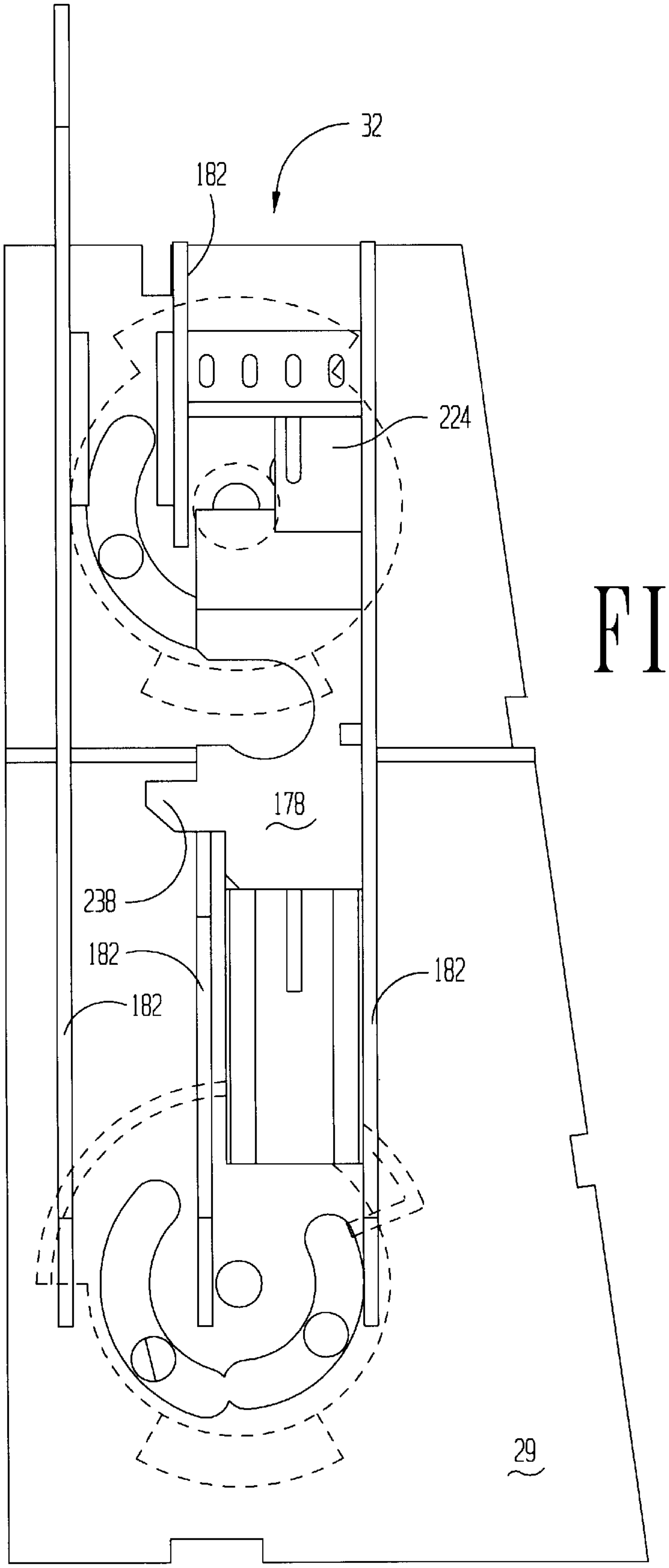
FIG. 23 Top plan view of the door lock mechanism with the cam interlock arm in place.
Figure 24:
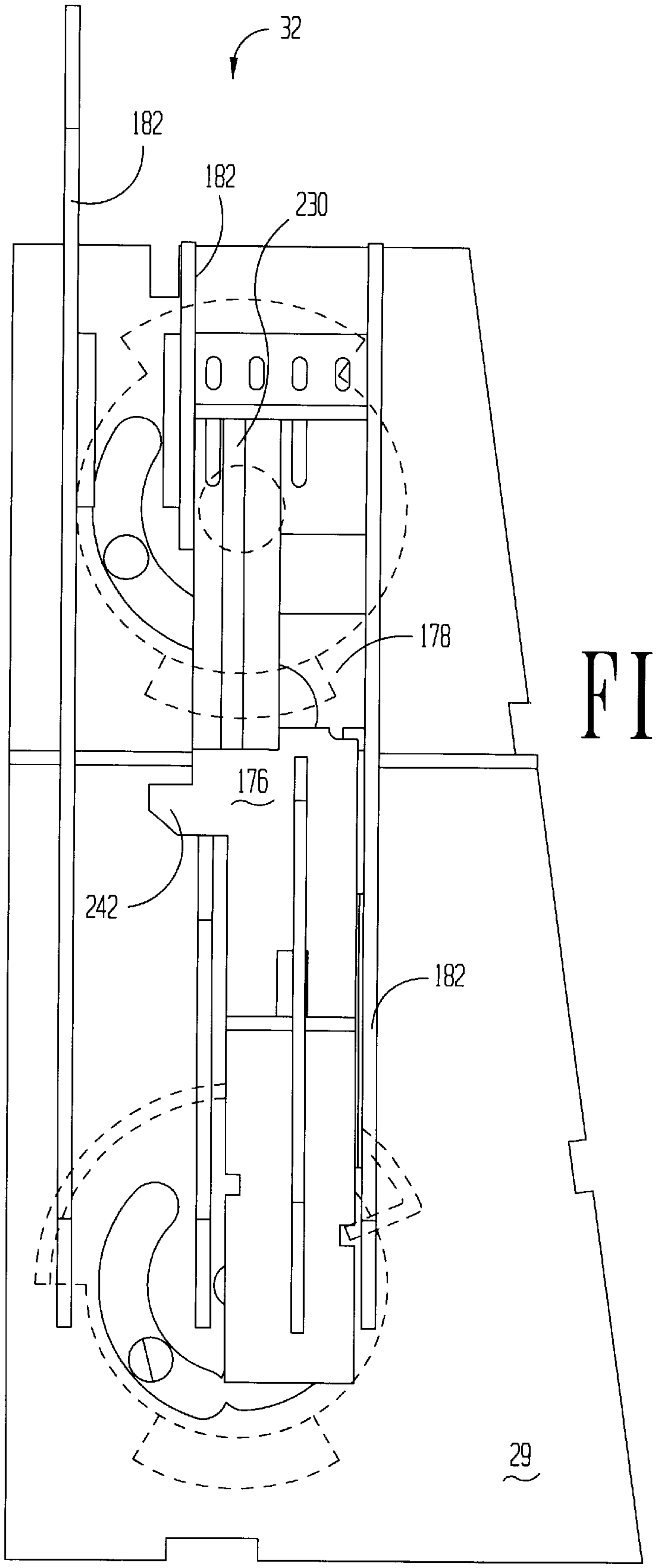
FIG. 24 Top plan view of the door lock mechanism with the cam interlock arm and the lower cam price lock arm in place.
Figure 25A:
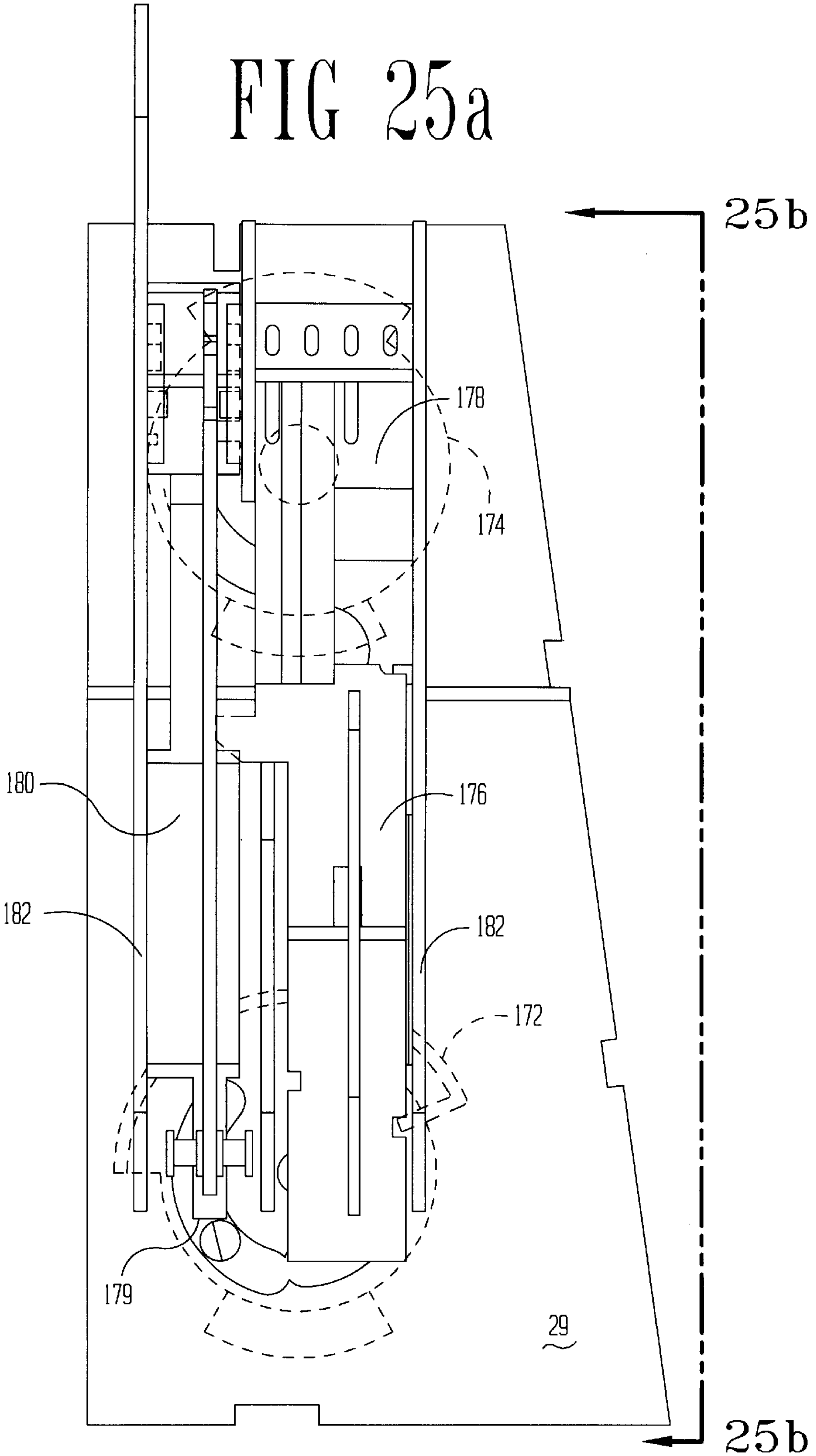
Figure 25B:
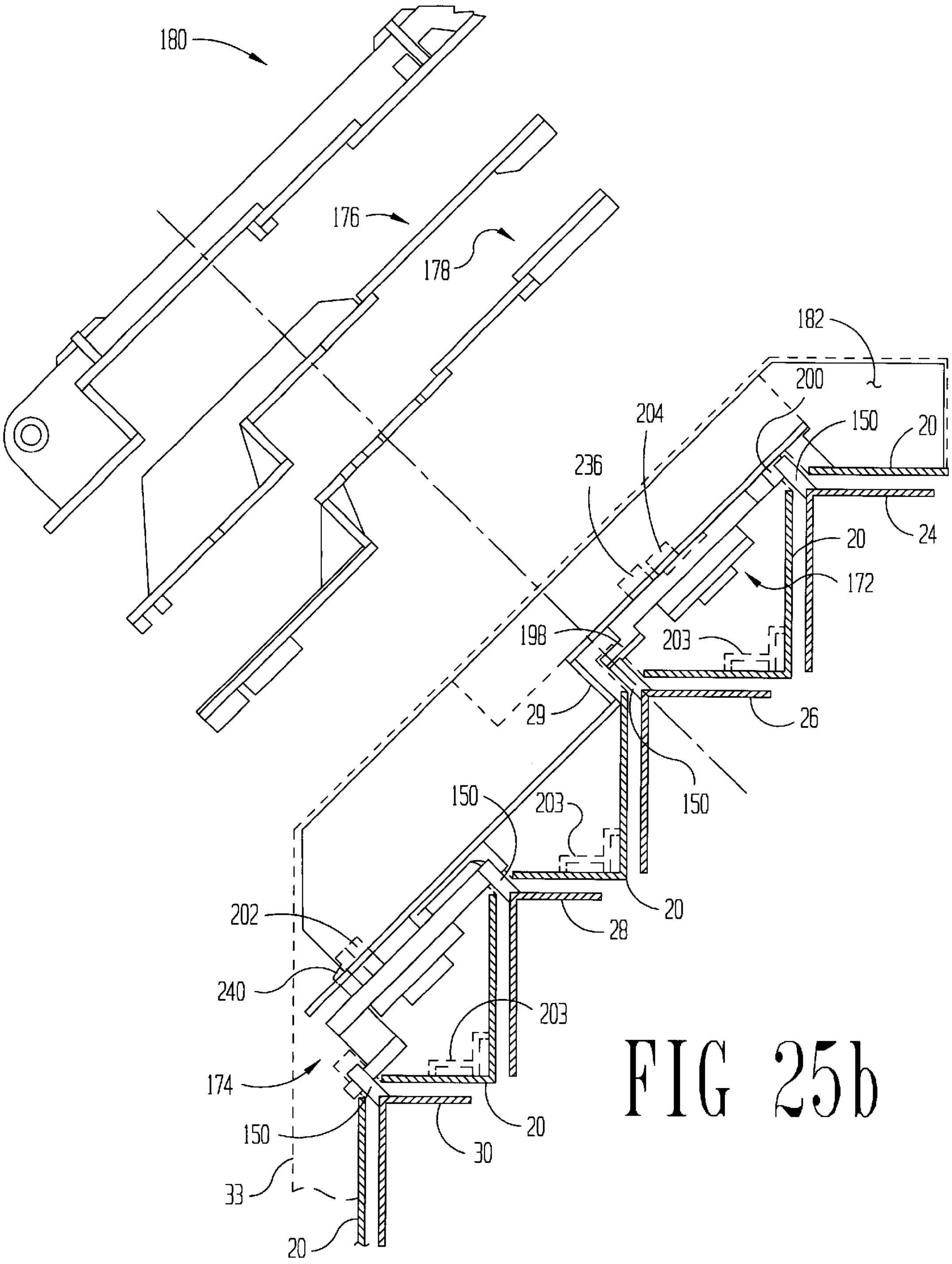
FIG. 25*b* Exploded side elevational view of the door lock mechanism taken substantially along line 25*b*—25*b* of FIG. 25*a*.
Figure 25C:
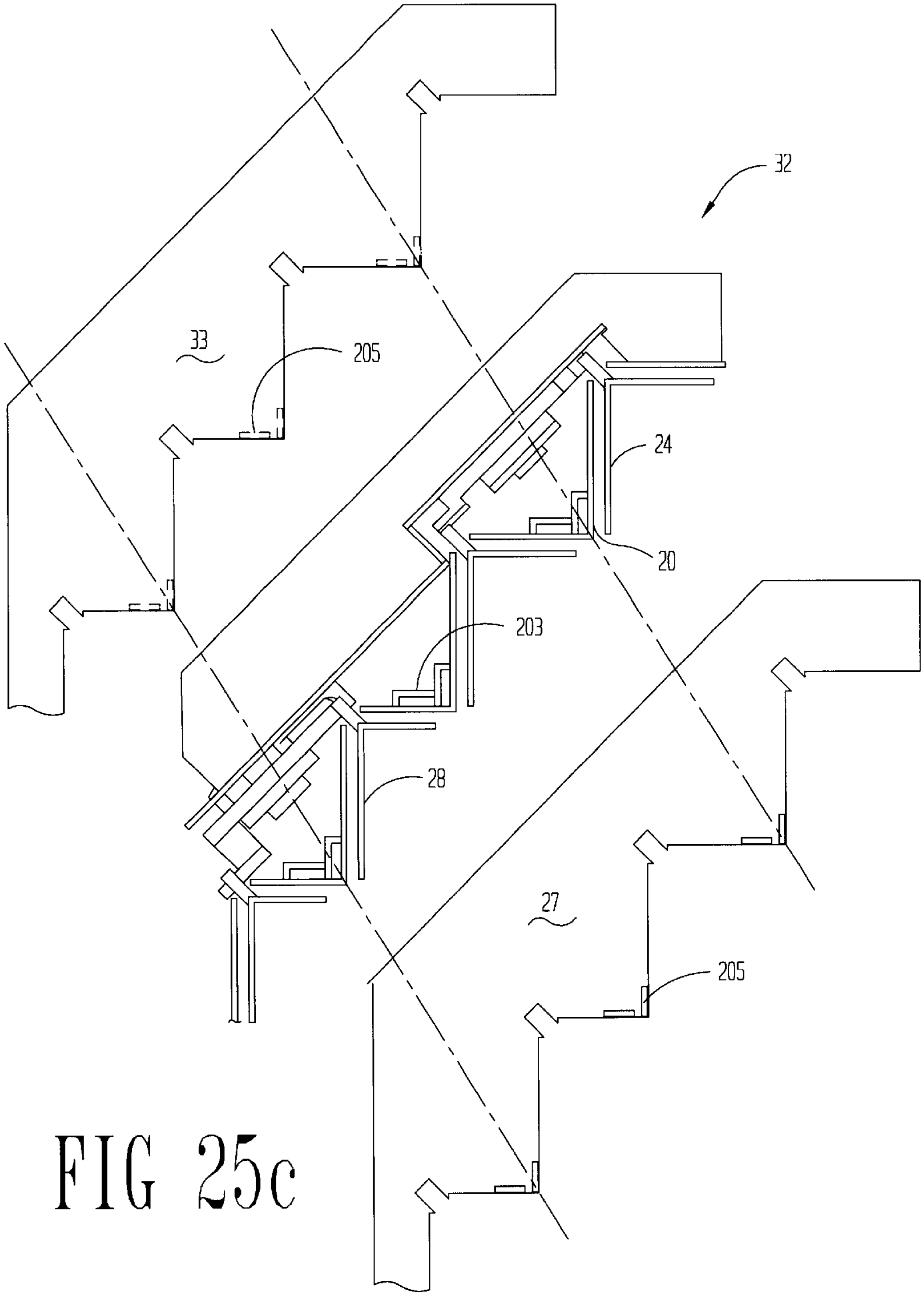
FIG. 25*c* Exploded side elevational view of the front and back cover and board.
Figure 26:
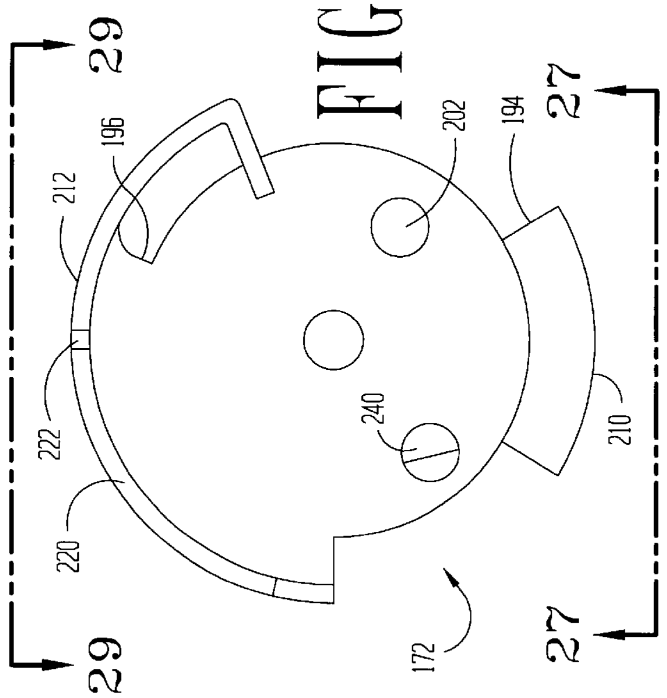
FIG. 26 Top plan view of the lower cam
Figure 27:
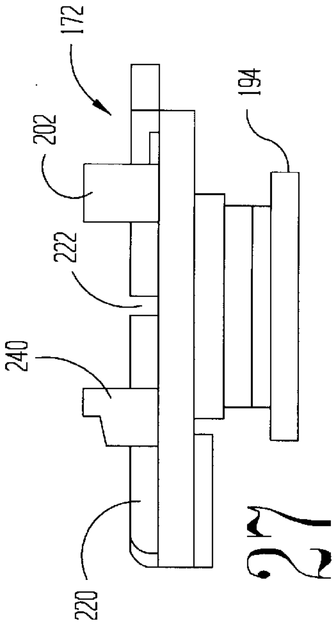
FIG. 27 Side plan view of the lower cam substantially along line 27—27 of FIG. 26.
Figure 28:
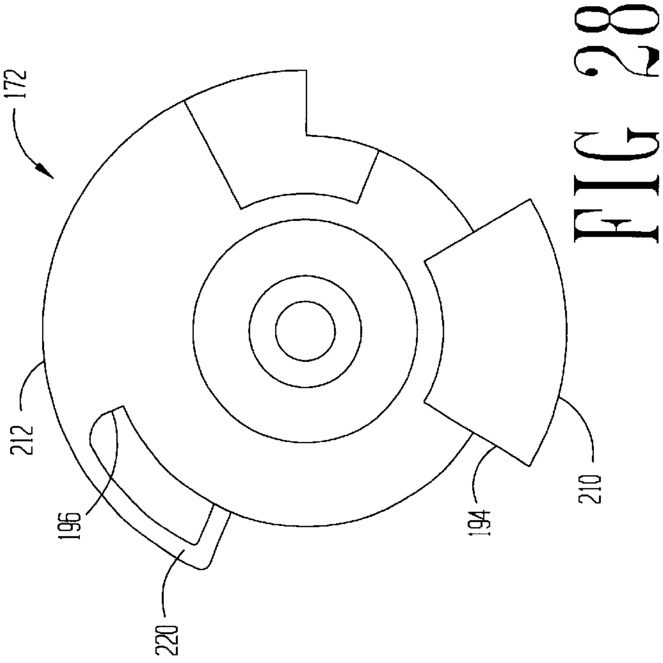
FIG. 28 Bottom plan view of the lower cam.
Figure 29:
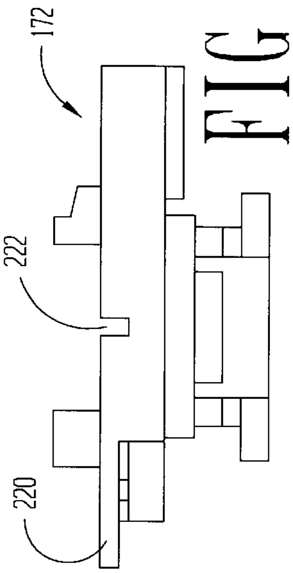
FIG. 29 Side plan view of the lower cam substantially along line 29—29 of FIG. 26.
Figure 30:
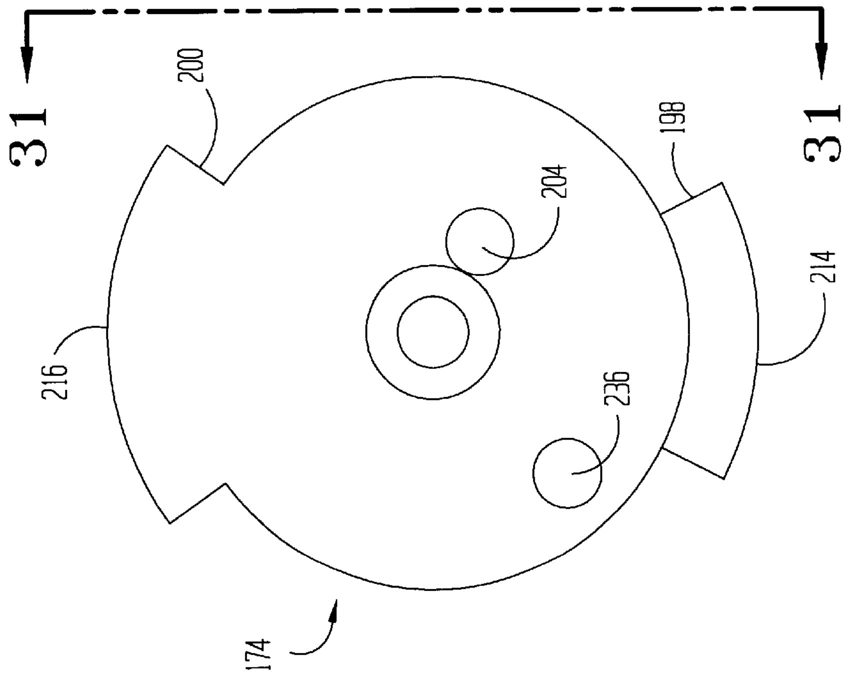
FIG. 30 Top plan view of the upper cam.
Figure 31:
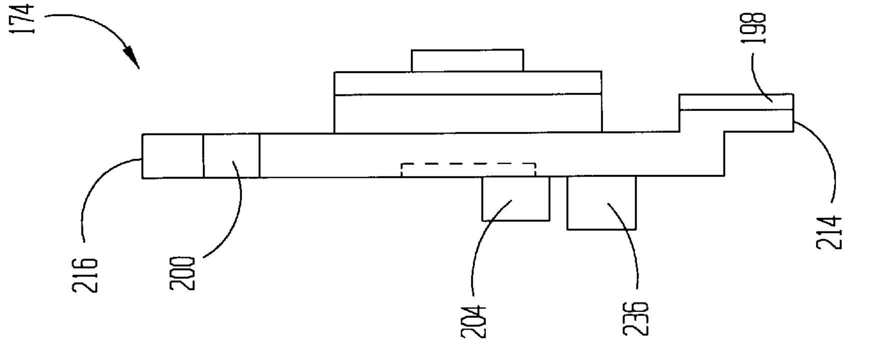
FIG. 31 Side view of the upper cam substantially along line 31—31 of FIG. 30.
Figure 32:
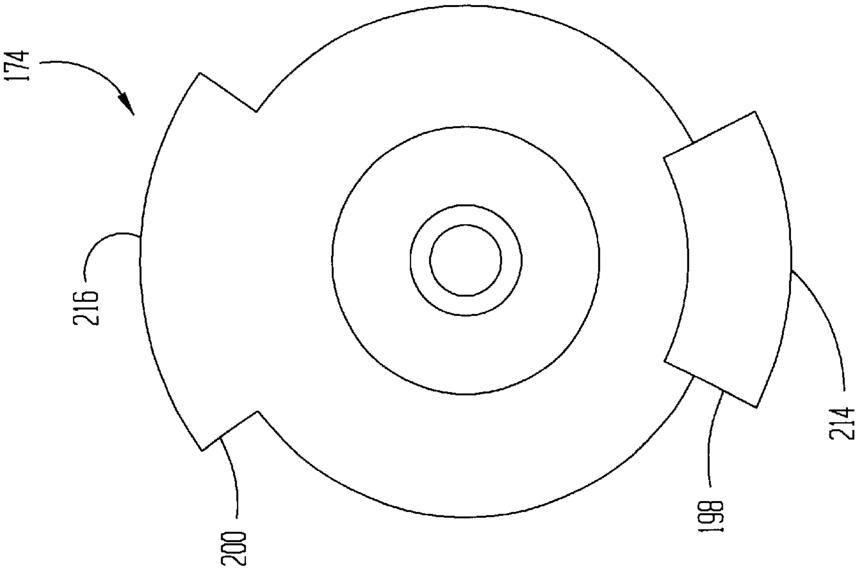
FIG. 32 Bottom plan view of the lower cam.

If the snack is in a single size slot, the snack dispenser uses a pin mechanism to control the doors. Each door has two pins which control the door. Pin #1 160, as seen in FIG. 1, is used to allow the door to only open to the length of a single slot if the snack selected by the customer is in a single slot 158. FIGS. 18 through 21 shows a schematic of the pin system. FIG. 21 depicts the process by which pin #1 160 will be used to stop the door if there is a single slot 158 space. As seen in FIG. 20, lever 164 and block 170 of the pin #1 160 are angled downward because there is not a removable divider 34 present in that position. Thus, the door will open to the length of a double slot 156 because the door will be impeded only by the door vane 150 hitting the back shell 20. However, if the divider 34 for a single slot 158 is present, pin #1 160 will be elevated by the divider and thus the block 170 will stop the door.(FIG. 21) The purpose of pin #1 is to ensure that someone who chooses an article in a single slot 158 will only have access to a single width snack and will not be able to take additional snacks from adjacent locations. FIGS. 20 & 21 show the door portion to be door 1 30, but the same principle applies on all the doors.

Pin #2 162, shown in FIG. 1 is used to ensure that the carousel is properly aligned. If the dividers are aligned so that the customer has access to a snack (whether that snack is in a single or double size slot), pin #2 162 will rise and allow the door to open. However, if the pin is not aligned properly with a divider, a block similar to block 170 of pin #1 will fall into slot 171 on the doors and ensure that the door cannot open. The process by which pin #2 162 works is the same as the process described above for pin #1 160. Although not shown for clarity, each of pin #1 160 and pin #2 162 is covered such that no tampering with the levers of each six system can occur which would thereby bypass their functions.

The levers 164 are pivoted to pin bases 168 mounted on front shell 22. The lever of pin #2 162 are mounted in reverse or mirror image to pin #1 160.

Doors are controlled by the door lock mechanism 32 (FIGS. 22–25). The door mechanism is located on the side of backshell 20. Although shown on FIG. 1 it is not shown on FIG. 7 for clarity. The mechanism 32 is covered by cover 33, partially on the front shell 22.(FIG. 13) The door lock mechanism comprises lower cam 172, upper cam 174, (FIGS. 26–32) and three different arms 176, 178, and 180. (FIGS. 33–39).

The door lock mechanism 32 serves the following functions: 1) it holds all doors closed until the proper amount of money has been entered; 2) unlocks individual level doors upon receiving the correct amount of change; 3) locks the carousel in position when any door is open to eliminate the possibility of a person emptying an entire row of snacks after opening a door; 4) once any door is open, the mechanism keeps the remaining doors from opening; and 5) resets the change counter after a door is opened.

The cam 172 and 174 are mounted for rotation on stubs on board 29. The board is attached to the back shell 20.

The upper cam 174 interlocks the doors for the fourth level 46 and the third level 44. The lower cam 172 interlocks the doors for the first level 40 and the second level 42. The interlocking feature among these two groups operate substantially the same. As a door is opened, the door contacts its appropriate cam and rotates that cam. This cam rotation moves a portion of the cam to block the opening of the second door in the group. More specifically then, referring to FIG. 26 there will be seen the lower cam 172. Further, the figure shows the contact point 194 for door one and the contact point 196 for door two. Vane 150 of a level's respective door is what actually contacts the contact points. As the door on the first level is opened, lower cam 172 is rotated by the door pushing at location 194. This rotation of the lower cam 172 rotates the door 2 block 212 such that the level 2 door cannot be opened. Operating the other way, opening the second level door 28 rotates the lower cam 172 in a counter-clockwise direction. This counter-clockwise rotation moves the door 1 block 210 such that door 1 may not be opened. The same description applies to the interlocking mechanism of the upper cam 174 in relation to the level 3 and level 4 door, 26 and 24 respectively. It will be understood that vane 150 of a door only rotates its respective cam less than 90 degrees before slipping past the cam yet still holding it in the rotated position. The slipping of the vane 150 past the contact point is most prevalent when opening a door over a double slot, but could be present to some degree even when opening a door over a single slot.

Figure 33:
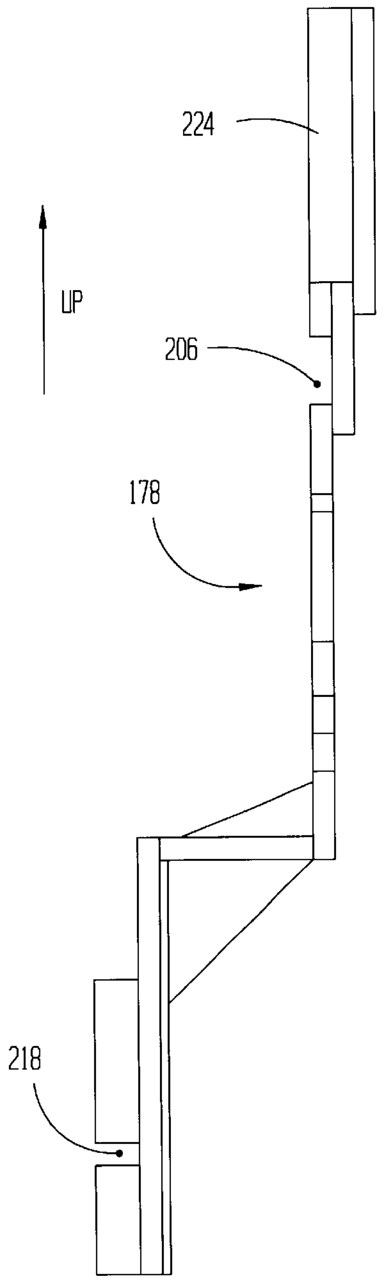
FIG. 33 Side plan view of the cam interlock arm substantially along 33—33 of FIG. 34.
Figure 34:
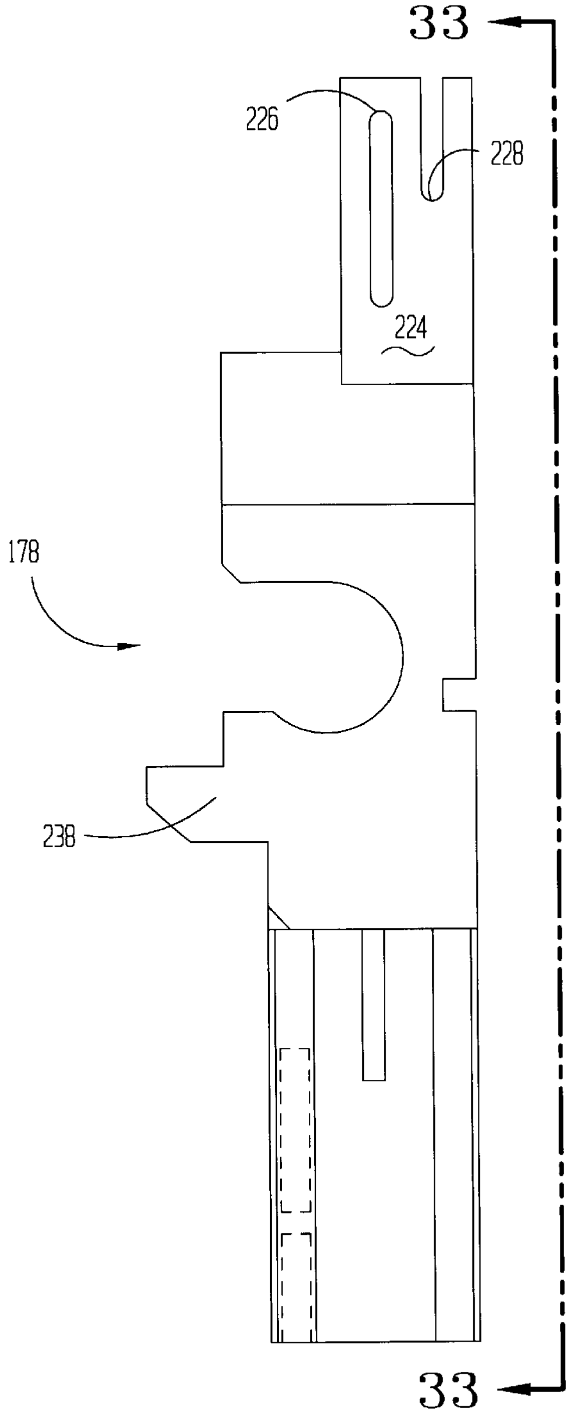
FIG. 34 Top plan view of the cam interlock arm.

The upper and lower cams not only interlock doors 3 and 4 and doors 1 and 2 respectively, they further interlock with each other to allow only one door to open at any one time. Interlocking between the cams is accomplished by the cam interlock arm 178 shown in FIGS. 33 and 34. The cam interlock arm 178 connects to the upper cam 174 via a shaft and slot mechanism; specifically, shaft 204 on the upper cam 174 slides into slot 206 on the cam interlock arm 178. Rotation of the upper cam 174 translates the cam interlock arm 178 up and down. Counter-clockwise rotation of the upper cam 174 moves the cam interlock arm 178 up as shown in FIG. 33. This counterclockwise rotation is caused by opening the door on the fourth level. Clockwise rotation of the upper cam 174 causes the cam interlock arm 178 to move down. Clockwise rotation of the upper cam 174 is caused by opening the door on the third level. It will be understood then that any rotation of the upper cam 174 causes a corresponding translation in the cam interlock arm 178.

The cam interlock arm 178 interacts with the lower cam 172 via a ridge and groove function. More specifically, the interlock arm groove 218 interacts with the ridge 220 on the lower cam 172. With all the doors in the at-rest position, i.e. all the doors closed, the ridge 220 aligns with the interlock arm groove 218 such that the lower cam 172 is free to move rotationally. Further, in the at-rest position, the upper cam 174 is free to rotationally move because the cam interlock arm groove 218 is aligned with the ridge slot 222 of the lower cam 172.

Interlocking between the cams is accomplished in the following manner: rotation of either the lower cam 172 or the upper cam 174 effectively blocks rotational movement of the other cam via the cam interlock arm 178. When either the level 1 door 30 or the level 2 door 28 is opened, the lower cam 172 rotates as previously described. This rotation causes the interlock arm groove 218 to ride along the lower cam ridge 220 such that the cam interlock arm 178 cannot translate up or down. When the cam interlock arm 178 is not able to move in either an up or down direction, this effectively stops the upper cam 174 from any rotational movement; therefore, the upper doors cannot open when the upper cam is not free to rotate.

Interlocking between the upper cam 174 and the lower cam 172 is again accomplished by the cam interlock arm 178. As the upper cam 174 is rotated, as caused by the opening of either upper door, the cam interlock arm 178 translates down or up as caused by the shaft 204 moving in the slot 206 as previously described. This movement causes a misalignment of the interlock arm groove 218 with the lower cam ridge 220 by movement of the interlock arm groove 218 in the ridge slot 222. Because of this misalignment of the interlock arm groove 218 and the ridge 220, the lower cam 172 is stopped from any rotational movement; therefore, the lower doors are blocked from opening. It will be noted in this configuration the doors are not blocked by the door block 210 or 212, but instead are kept from opening by contacting the cam contact points 194 and 196.

The cam interlock arm 178 serves another function; namely, it further acts as a price level release by operation of the price lock portion 224. The price lock portion 224 consists of a downward block 226 and an upward block 228. Using these blocks, the coin counting mechanism (not described here) releases individual levels as money is added to the system. If the cam interlock arm 178 is blocked from movement in either the upward or downward direction, this effectively blocks opening of the level 3 door 26 and level 4 door 24 respectively.

Figure 35:
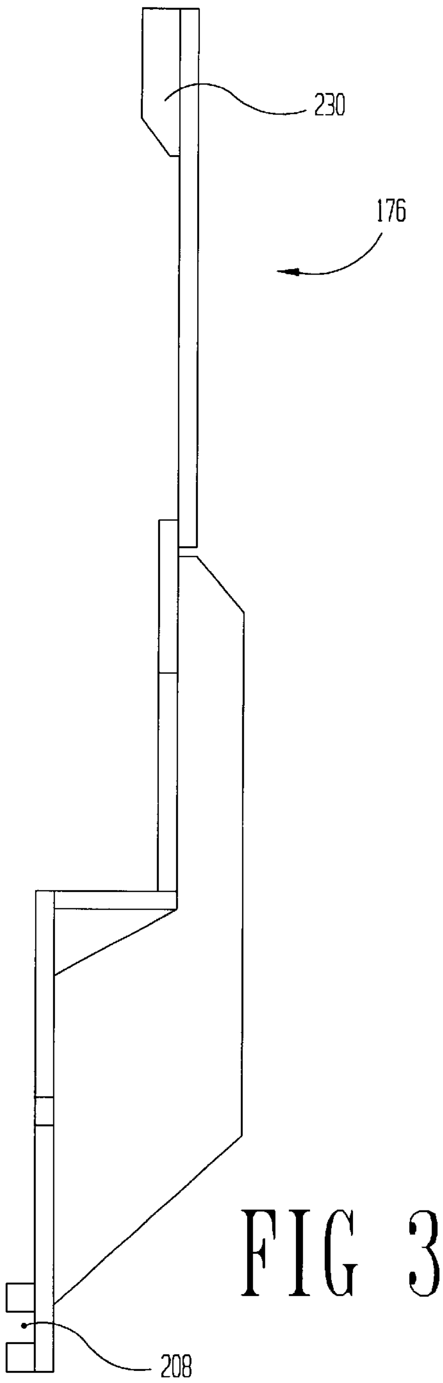
FIG. 35 Side plan view of the lower cam price block arm.
Figure 36:
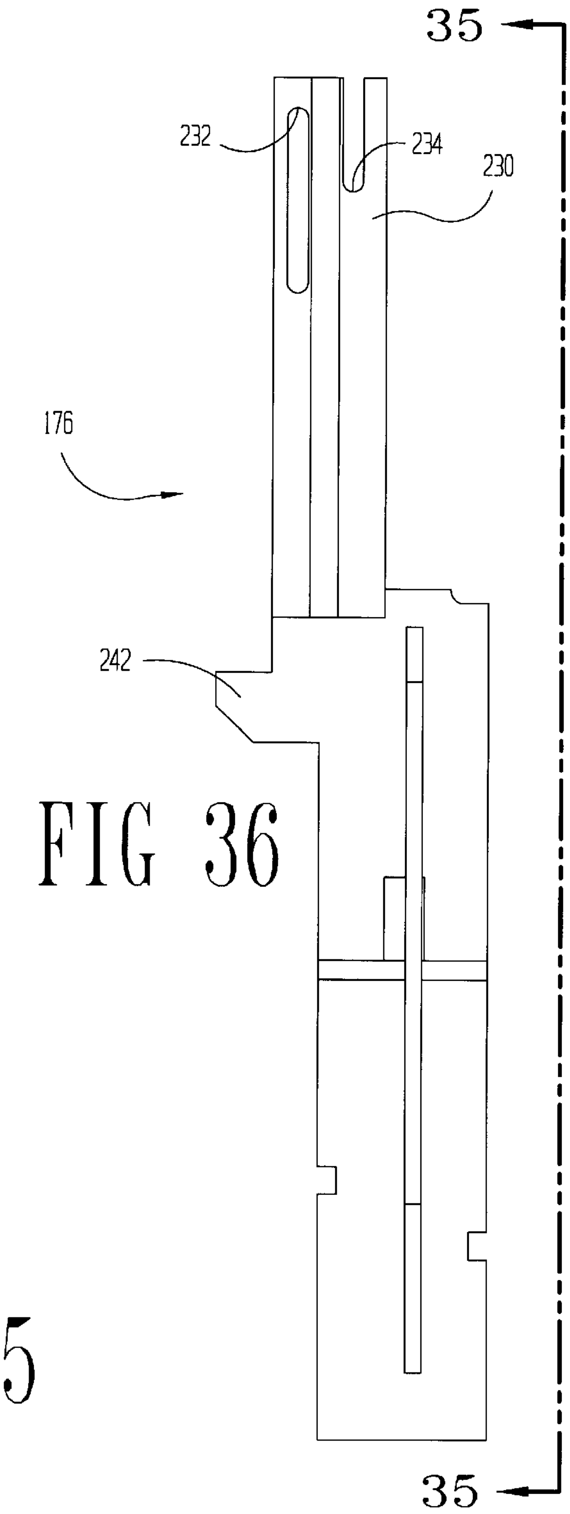
FIG. 36 Top plan view of the lower cam price block arm.

FIGS. 35 and 36 show the lower cam price block arm 176. The lower cam price block arm 176 serves two functions: 1) to block the lower level doors from being open before an appropriate amount of money has been entered; and 2) to operate the carousel stop arm 180.

Figure 37:
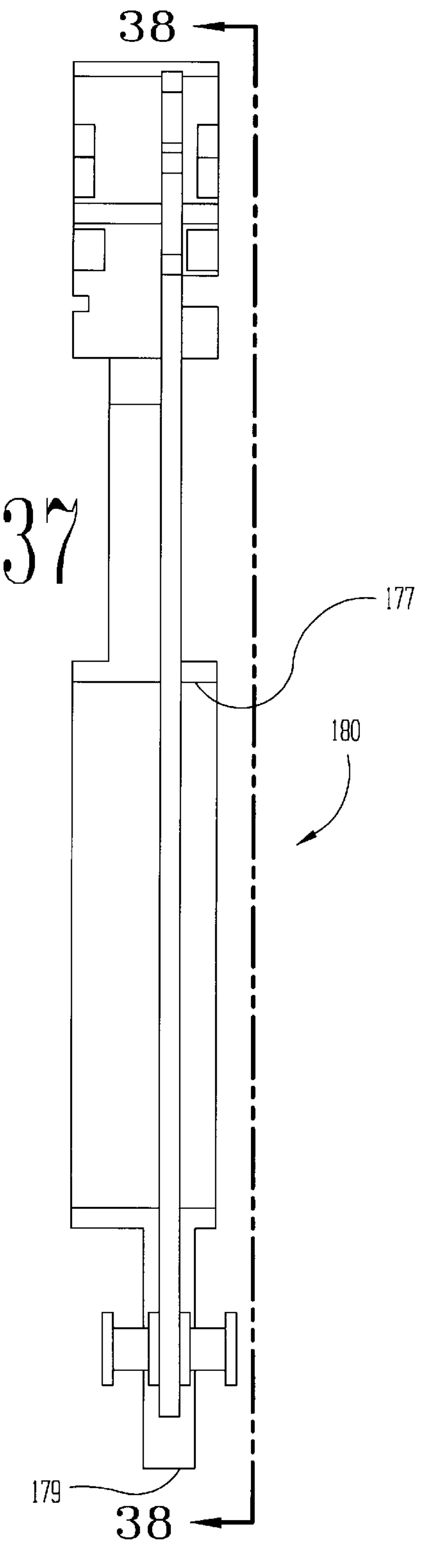
FIG. 37 Top plan view of the carousel lock arm.
Figure 38:
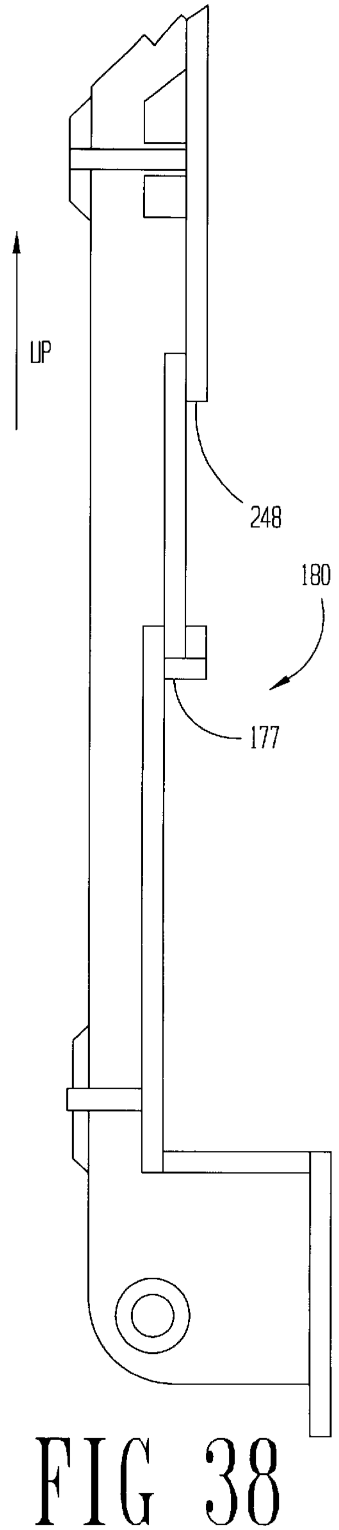
FIG. 38 Side plan view of the carousel lock arm substantially along line 38—38 of FIG. 37

The lower cam price block arm 176 accomplishes price level locks via the price lock portion 230. Just like the price lock portion 224 on the cam interlock arm 178, the price lock arm 230 consists of a downward block 232 and an upward block 234. If the lower cam price block arm 176 cannot move because of a impediment in either the downward block 232 or the upward block 234 location, this effectively stops the lower cam 172 from rotating. This rotational block keeps the lower doors from operating by blocking them against the contact points 194 and 196. The lower cam price block arm interacts with the lower cam by operation of shaft slot 208 with shaft 202 of the lower cam. Referring to FIGS. 37 and 38 there will be seen the carousel stop arm 180. The carousel stop arm 180 serves three functions: 1) to lock the carousel in place such that it may not be rotated while any door is open; 2) to reset the change counter; and 3) identify from which level a snack has been purchased.

Regardless of which door is open, and correspondingly regardless of which cam is rotated, the carousel stop arm 180 translates in the upward direction with the opening of the door as indicated in FIG. 38. When the upper cam 174 is rotated in the clockwise direction, i.e. opening the third level door, the carousel stop arm 180 is forced upward by operation of shaft 236 on the upper cam 174 in groove 248 on the carousel stop arm 180. The shaft 236 is positioned in groove 248 such that it only contacts the upper portion of groove 248 during clockwise rotation of the upper cam 174. During counter-clockwise rotation of the upper cam 174, the shaft 236 does not contact any sidewalls of groove 248. Upward translation of the carousel stop arm 180 during counter-clockwise rotation of the upper cam 174 is accomplished by operation of the push bar 238 on the cam interlock arm 178 pushing at push location 177 as shown in FIGS. 37 and 38.

Restated then, upward movement is caused by operation of the shaft 236 in the groove 248 when the upper cam 174 is rotated in a clockwise direction. Upward movement of the carousel stop arm 180 when the upper cam is rotated in the counter-clockwise is caused by operation of the push bar 238 of the cam interlock arm 178 pushing on the carousel stop arm 180 at location 177. Likewise, the carousel stop arm 180 is forced upward with each movement of the lower cam 172. When the lower cam 172 is rotated in the clockwise direction, shaft 240 interacts with the carousel stop arm at location 179 to force it upward. When the lower cam 172 is rotated in the counter-clockwise direction, the push bar 242 on the lower cam 172 price block arm 176 operates to force the carousel stop arm 180 in the upward direction by pushing on the carousel stop arm 180 at location 177.

It is this upward movement of the carousel stop arm 180 that resets the change counter upon the opening of a door on any level. In this regard, the carousel stop arm could equally be called a clear credit arm.

As a statement of how a simple coin control would operate it will be understood that before any money is inserted that all arms will be blocked by pins 312 (FIG. 41) inserted through notch 226 against downward block 226, through notch 228 against the upper block 228, through downward notch 232 against downward block 232, and through upward notch 234 against upward block 234.

Referring to FIGS. 41 and 42 which show that when an activating force through an element 318 moves against arm 316 of lever 310 that the lever 310 will pivot about pivot shaft 320 compressing spring 314. This pivoting motion will withdraw pin 312 from one of the notches selected from notches 226, 228, 232 and 234. As previously disclosed the withdrawal of the pin 312 permits the door to open to dispense a snack. A coin controller in the coin box 18 has the mechanism to provide the activating force to move a selected element 318. The selected element is on the basis of the value of coins deposited. Coin controllers to select the activating force are known. See for example STONER et al, U.S. Pat. No. 2,934,192.

As previously described, the opening of a door will move arm 180 to clear the credit. The clearing of the credit will remove the activating force to hold the element 318 against the arm 316. Then the spring 314 will rotate the lever 310 so that the pin 312 is again reinserted against notches.

Figure 39:
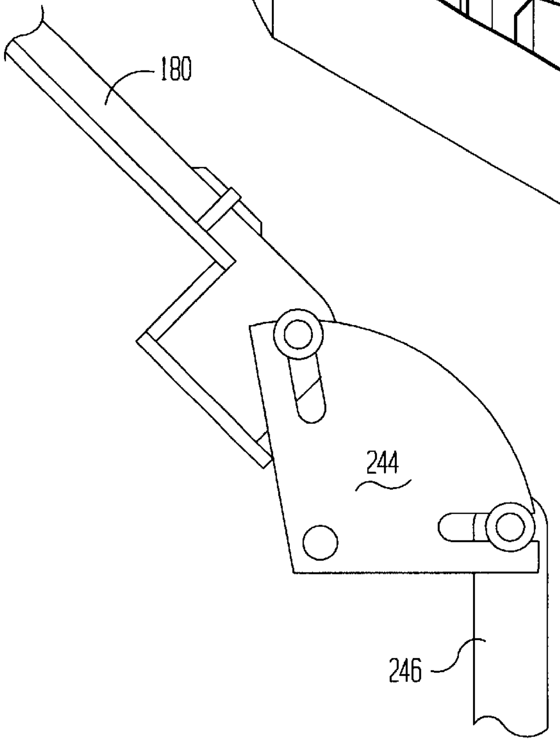
FIG. 39 Side schematic view of the carousel lock arm, rocker and lock member.

Further, and as the name implies, the carousel stop arm 180 locks carousel rotation with each upward movement. The carousel lock arm is one in a series of members that locks the carousel in place responsive to opening of a door on the vending unit. As previously mentioned, the carousel lock arm translates upward upon the opening of any door. This upward translation locks rotation of the carousel by rocking rocker 244 which translates up lock member 246. The interplay between these pieces is shown in FIG. 39. Lock member 246, when translated upward, locks rotation of the carousel by sliding a pin or shaft in the holes of the locking ring 102.

Although not indicated in the drawings, there exists a spring physically connected to lock member 246. The spring tension tends force lock member 246 toward the base 12 of the invention which is an unlocked position of the carousel. The force created by this spring propagates upward through the lock member 246, rocker 244 and carousel stop arm 180 to provide a force to return to a beginning position. By the same mechanisms that force the carousel stop arm 180 up with the opening of any individual door, the spring connected to the lock 246 then tends to close any door that is open.

Guide rails 182 on board 29 guide the arms 176, 178, and 180.

It will be understood that how far up the carousel stop arm translates up varies depending on which door is opened. It is the variance in translation length that is used to identify from which level a vend has taken place. This information can be read in by and stored in relatively inexpensive electronic circuitry for later analysis.

The board is attached to front cover support 33*f* at the front and to back cover support 33*b* at the back. Basically, these supports are identical in size and shape too and rest upon the front cover 27. However, the front cover 27 does not provide the support of elements 33*f* and 33*b*. The cover clips 205 on the covers 33*f* and 33*b* will match the front and back shell clips 201 and 203. The cover 33 will fit with the covers 33*f* and 33*b*.

A unique characteristic of the tray system is that the segment assemblies 110 expand telescopically to form a "wedding cake" design, but also can collapse into a flat conformation, whereby each tray is of near identical height. The primary advantage of this tray system is that the snack replenisher (i.e. the person who will maintain the snack dispenser) can efficiently and quickly exchange the deplenished segment assemblies with replenished segment assemblies by simply removing the deplenished ones from the snack dispenser, collapsing them, and replacing the deplenished segment assemblies with replenished ones.

Therefore, replenishing the snack dispenser as described by this invention comprises the following steps: 1) removing the front shell 22 (thus opening the snack dispenser); 2) revolve the carousel so one segment assembly 110 is at the open gap of the back shell 20; 3) remove the deplenished segment assembly from the snack dispenser; 4) collapse the deplenished segment assembly and place it in a box 109; (FIG. 40) 5) telescope a replenished segment assembly; 6) place the telescoped segment assembly in the snack dispenser; 7) repeat steps three to six until all the deplenished segment assemblies have been replaced; 9) exchange the full change receptacle with a replenished change receptacle; and 10) place and lock the front shell back 22 on the snack dispenser.

Figure 40:
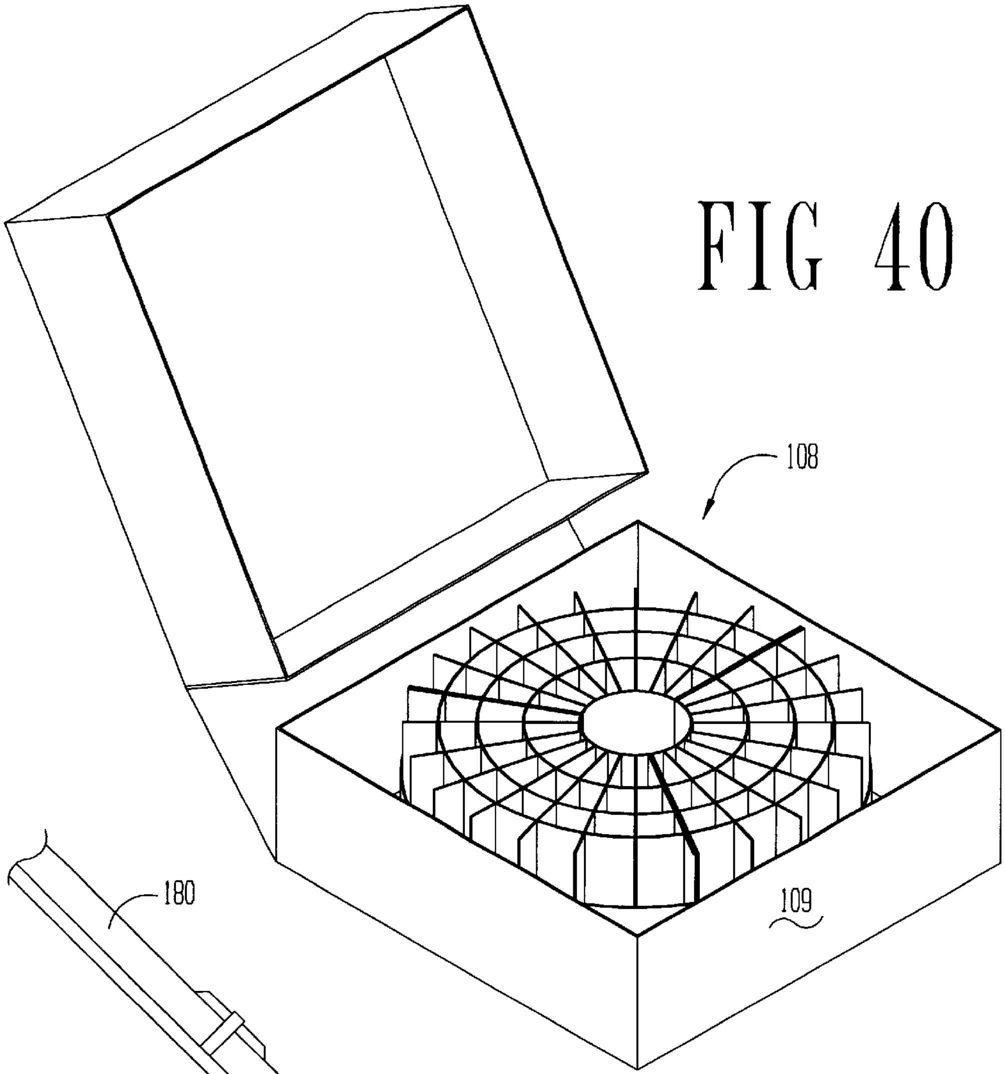
FIG. 40 Perspective view of the collapsed tray assembly in a box.

The box 109 shown in FIG. 40 is somewhat of a specialty item. The internal dimensions of the box need to be great enough to allow the insertion of the collapsed segment assemblies 110. The segment assemblies 110 should be placed in the box to form a circle. A full coin box 18 from a replenished snack vending machine will be placed in the center of the box in the hole created in the center of the segment assemblies 110. So that only one box would be required to be carried in to replenish a snack vendor, the lid of the box should be sized to hold the same elements as just described when open. In that regard, a person replenishing a snack vendor would open the box cover and fold it around to be substantially on the same plane as that portion of the box holding the replenished segment assemblies 110 and empty coin box. As the deplenished segment assemblies are removed from the snack vendor they are placed in what was formally the lid of the box. Once all the replenished segment assemblies are placed in the snack vendor and the deplenished segments assemblies are placed in what was the lid of the box, along with the full coin box, what was the base of the box now becomes the lid and is folded over to cover the deplenished segment assemblies and full coin box.

The boxed collapsed segment assemblies can be easily stacked on top of the other boxed segment assemblies and returned to the snack distributor to be replenished with new snacks.

According to known technology, a battery powered electronic device within the coin box 18 can readily determine and accumulate the value of the coins which are deposited in the box. Also the electronic device can readily read an identification indicia located in the coin box 106 into which the coin box 18 is inserted. Thus personell at the replenishing area can verify the actual money in the coin box with the total value which has been accumulated from the coins. Likewise, the electronic device can record the number of movements of the respective arms that are moved with the opening of the doors. In this way the replenishing center personell can correlate the number of snacks on each level and price level which have been vended with the physical number left in the replenished tray. With this information, the overpay can be easily calculated as well as the price variety of snacks that are being vended at each of the locations according to the data obtained.

Purchasing a snack from the vending unit will then comprise the following steps: 1) A potential customer would approach the vending unit and survey the snacks contained under the transparent front shell by turning the carousel with that portion of the exposed lock ring; 2) The potential customer would then position the desired item underneath the door; 3) The customer would then place money in the coin box where said money will be summed (coin box internals not described in this application); 4) As money is added to the coin box, individual level doors are released when the sum of the money entered is equal to or greater than the money required to open a door on that particular tier; 5) The customer opens the door above the item desired; 6) The customer removes the desired item from the slot; and 7) When the door is closed the spring associated with a lock member returns parts to an original position. All the doors are again locked closed until the cycle can be repeated.

By the above specifications and drawings, one with ordinary skill in the art will understand how to make and use the invention as described. At this time the description above includes the best mode known to the inventor of carrying out his invention.

The restrictive description and drawings of the specific examples above do not point out what an infringement of this patent would be, but are to enable one skilled in the art to make and use the invention. The limits of the invention and the bounds of the patent protection are measured by and defined in the following claims.

It will be understood the term "mechanically" as used herein means the function or method step is accomplished by movement of purely structural elements as opposed to electrical wiring and solenoids moving said elements. In other words, mechanical or mechanically as used herein specifically excludes the use of any electrical signal or device.

What is claimed is:

1. The structure of a snack vending system comprising, a) a plurality of stacked circular display levels, b) at least a portion of said stacked circular display levels being made of transparent material, c) each of said stacked circular levels of smaller diameter than the level below, therefore d) said stacked display levels when telescoped forming a tiered tray assembly, e) said tiered tray assembly comprising a plurality of arcuate segments, and f) each of said segments having a portion of each stacked circular display level.

2. The structure of a snack vending system comprising:

a) a plurality of stacked circular display levels, b) at least a portion of said stacked circular display levels being made of transparent material, c) each of said stacked circular levels of smaller diameter than the level below, therefore d) said stacked display levels when telescoped forming a tiered tray assembly, e) said stacked display levels of said tiered tray assembly collapsible to substantially uniform height conformation, f) a box, and g) said collapsed tray assembly in said box.

3. The structure as defined in claim 2 further comprising:

h) the interior height of the box approximately equals the uniform height conformation which is approximately equal to the height of each level.

4. The structure of a snack vending system comprising:

a) a plurality of stacked circular display levels, b) at least a portion of said stacked circular display levels being made of transparent material, c) each of said stacked circular levels of smaller diameter than the level below, therefore d) said stacked display levels when telescoped forming a tiered tray assembly, e) a rotatable race, f) radial tray supports on said race, each radial tray support having a support surface for each level, and g) said tiered tray assembly placed on said radial tray supports.

5. The structure of a snack vending system comprising:

a) a plurality of stacked circular display levels, b) at least a portion of said stacked circular display levels being made of transparent material, c) each of said stacked circular levels of smaller diameter than the level below, therefore d) said stacked display levels when telescoped forming a tiered tray assembly, e) a shell covering said tiered tray assembly, f) said shell locked in place to secure articles thereunder, g) said shell shaped with levels to substantially conform to said tiered trays assemblies in the telescoped configuration, h) at least a portion of said shell being transparent, i) a door hole in each level of said shell to allow access to articles in slots of a level of the tiered tray assembly, and j) a door slidably mounted one each in the door hole of the shell.

6. The structure of a snack vending system comprising:

a) a plurality of stacked circular display levels, b) at least a portion of said stacked circular display levels being made of transparent material, c) each of said stacked circular levels of smaller diameter than the level below, therefore d) said stacked display levels when telescoped forming a tiered tray assembly, e) each tray of said tiered tray assembly having permanent dividers forming full width slots between them.

7. The structure as defined in claim 6 further comprising:

f) some of said full width slots being capable of division into two single width slots by placing a removable divider in said full width slots.

8. The structure as defined in claim 7 further comprising:

g) a pin system to block opening of doors beyond a single slot width when a removable divider is present.

9. The structure as defined in claim 7 further comprising:

g) ninety six possible slots with all removable dividers in place.

10. The structure of a snack vending system comprising:

a) a plurality of stacked circular display levels, b) at least a portion of said stacked circular display levels being made of transparent material, c) each of said stacked circular levels of smaller diameter than the level below, therefore d) said stacked display levels when telescoped forming a tiered tray assembly, e) said tiered tray assembly comprising a plurality of arcuate segments, f) each of said arcuate segments having a portion of each stacked display level, g) said stacked display levels of said tiered tray assembly collapsible to substantially uniform height conformation, h) a rotatable race, i) radial tray supports on said race, each radial tray support having a support surface for each level, j) said tiered tray assembly being placed on said tray supports, k) a shell covering said tiered tray assembly, l) said shell locked in place to secure articles thereunder, m) said shell shaped with levels to substantially conform to said tiered trays assemblies in the telescoped configuration, n) at least a portion of said shell being transparent, o) a door hole in each level of said shell to allow access to the articles in the slots of a level of the tiered tray assembly, p) a door slidably mounted one each in the door holes of the shell, q) each tray of said tiered tray assembly having permanent dividers forming full width slots between them, r) each of said full width slots being capable of division into two single width slots by placing a removable divider in said full width slots, s) a pin system to block opening of doors beyond the single slot width when a removable divider is present, t) ninety six possible slots with all removable dividers in place, u) said tiered tray assembly consisting of four stacked circular display levels.

* * * * *